United States Patent
Tooher et al.

(10) Patent No.: US 11,889,368 B2
(45) Date of Patent: Jan. 30, 2024

(54) METHOD AND APPARATUS FOR PERFORMING PHYSICAL LAYER MOBILITY PROCEDURES

(71) Applicant: InterDigital Patent Holdings, Inc., Wilmington, DE (US)

(72) Inventors: J. Patrick Tooher, Montreal (CA); Ghyslain Pelletier, Montreal (CA); Benoit Pelletier, Roxboro (CA); Paul Marinier, Brossard (CA); Yugeswar Deenoo, Chalfont, PA (US); Martino M. Freda, Laval (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 510 days.

(21) Appl. No.: 16/089,899

(22) PCT Filed: Mar. 30, 2017

(86) PCT No.: PCT/US2017/024936
§ 371 (c)(1),
(2) Date: Sep. 28, 2018

(87) PCT Pub. No.: WO2017/173037
PCT Pub. Date: Oct. 5, 2017

(65) Prior Publication Data
US 2020/0305038 A1    Sep. 24, 2020

Related U.S. Application Data

(60) Provisional application No. 62/334,630, filed on May 11, 2016, provisional application No. 62/315,080, filed on Mar. 30, 2016.

(51) Int. Cl.
*H04W 36/00* (2009.01)
*H04W 84/04* (2009.01)
(Continued)

(52) U.S. Cl.
CPC ....... *H04W 36/0085* (2018.08); *H04W 24/10* (2013.01); *H04W 36/0055* (2013.01);
(Continued)

(58) Field of Classification Search
CPC ......... H04W 36/0055; H04W 36/0085; H04W 36/36; H04W 24/10; H04W 48/16; H04W 74/0833; H04W 84/045
See application file for complete search history.

(56) References Cited

U.S. PATENT DOCUMENTS 9,204,339 B2    12/2015  Pekonen et al.
9,532,362 B2    12/2016  Marinier et al.
(Continued)

FOREIGN PATENT DOCUMENTS

CN    101690359 A    3/2010
CN    101715237 A    5/2010
(Continued)

OTHER PUBLICATIONS

Ericsson, "Mobility based on DL and UL measurements," 3GPP TSG-RAN WG2 #95, R2-165539, Gothenburg, Sweden (Aug. 22-26, 2016).
(Continued)

*Primary Examiner* — Pao Sinkantarakorn
(74) *Attorney, Agent, or Firm* — Flaster Greenberg, P.C.

(57) ABSTRACT

Methods to perform, maintain and report measurements on a transmission-reception point (TRP) using limited reference signal transmission are described herein. The mobility measurement reports may utilize physical channels. Methods to obtain measurements on neighbor TRPs using limited RS transmissions are also described herein. Random-Access procedures to enable the addition of a neighbor TRP or handover without requiring higher layer signaling (and possibly without an interface between source and target
(Continued)

TRP) are also described herein. New triggers to perform RA in order to decrease handover latency are also described herein. Wireless Transmit/Receive Unit (WTRU) behavior upon receiving RAR from multiple possible TRPs are also described herein. For example, a WTRU may store RAR information and use it later in an interrupted RA procedure.

16 Claims, 9 Drawing Sheets

(51) Int. Cl.
    H04W 24/10      (2009.01)
    H04W 74/08      (2009.01)
    H04W 48/16      (2009.01)
(52) U.S. Cl.
    CPC ....... *H04W 48/16* (2013.01); *H04W 74/0833* (2013.01); *H04W 84/045* (2013.01)

(56) References Cited

U.S. PATENT DOCUMENTS

| | | | |
|---|---|---|---|
| 9,949,261 | B2 | 4/2018 | Chen et al. |
| 2009/0005029 | A1 | 1/2009 | Wang et al. |
| 2009/0291686 | A1 | 11/2009 | Alpert et al. |
| 2010/0232327 | A1* | 9/2010 | Kim ...................... H04W 36/36 370/331 |
| 2012/0213109 | A1 | 8/2012 | Xu et al. |
| 2013/0315157 | A1* | 11/2013 | Krishnamurthy ..... H04L 5/0073 370/329 |
| 2013/0322376 | A1 | 12/2013 | Marinier et al. |
| 2014/0192672 | A1 | 7/2014 | Seo et al. |
| 2014/0241323 | A1 | 8/2014 | Park et al. |
| 2014/0364125 | A1* | 12/2014 | Fudaba ................. H04W 36/22 455/438 |
| 2015/0208290 | A1 | 7/2015 | Seo et al. |
| 2015/0312815 | A1* | 10/2015 | Wanstedt ............ H04W 72/044 455/436 |
| 2016/0192261 | A1* | 6/2016 | Wang .................... H04W 36/30 370/331 |
| 2016/0205664 | A1 | 7/2016 | Zhang et al. |
| 2017/0085326 | A1 | 3/2017 | Li et al. |
| 2017/0118690 | A1* | 4/2017 | Patel .................... H04W 36/36 |
| 2017/0135134 | A1* | 5/2017 | Rune ................. H04W 74/0833 |
| 2017/0230869 | A1* | 8/2017 | Kubota ................ H04W 76/10 |
| 2018/0027524 | A1* | 1/2018 | Zhang ................ H04W 72/005 455/453 |
| 2019/0059029 | A1* | 2/2019 | Lunden ................ H04W 36/36 |

FOREIGN PATENT DOCUMENTS

| | | |
|---|---|---|
| CN | 102217362 A | 10/2011 |
| CN | 102577571 A | 7/2012 |
| CN | 104584450 A | 4/2015 |
| CN | 105101283 A | 11/2015 |
| EP | 2 809 106 | 12/2014 |
| KR | 20130123452 A | 11/2013 |
| KR | 20140033773 A | 3/2014 |
| KR | 20140061430 A | 5/2014 |
| KR | 10-2015-0027194 A | 3/2015 |
| KR | 20150052081 A | 5/2015 |
| WO | 2010057128 A1 | 5/2010 |
| WO | 2013/025558 A1 | 2/2013 |
| WO | 2013/180513 A1 | 12/2013 |
| WO | 2014075531 A1 | 5/2014 |

OTHER PUBLICATIONS

Frenger, "From Always Available to Always Optimized" Towards 5G-5Green System Design, pp. 1-28 (Aug. 27, 2014).
Nokia et al., "Considerations on mobility based on UL signals," 3GPP TSG-RAN WG2 Meeting #95, R2-164893, Gothenburg, Sweden (Aug. 22-26, 2016).
NTT DOCOMO, "New SID Proposal: Study on New Radio Access Technology," 3GPP TSG RAN Meeting #71, RP-160671, Göteborg, Sweden (Mar. 7-10, 2016).
Qualcomm Incorporated, "Mobility considerations for NR," 3GPP TSG-RAN WG2 Meeting #94, R1-164710, Nanjing, China (May 23-27, 2016).
Qualcomm Incorporated, "Mobility procedures—decision points and measurements," 3GPP TSG-RAN WG2 Meeting #95, R2-165567, Gothenburg, Sweden (Aug. 22-26, 2016).
Samsung et al., "Principle/Guideline: Minimum SI TX in Camping Cell," 3GPP TSG-RAN WG2 95bis, R2-166393, Kaohsiung, Taiwan (Oct. 10-14, 2016).
Samsung, "Network topology and system operation for NR," 3GPP TSG RAN WG1 #85, R1-164021, Nanjing, China (May 23-27, 2016).
Third Generation Partnership Project, "Technical Specification Group Radio Access Network; Evolved Universal Terrestrial Radio Access (E-UTRA); Physical channels and modulation (Release 12)," 3GPP TS 36.211 V13.0.0 (Dec. 2015).
Third Generation Partnership Project, "Technical Specification Group Radio Access Network; Evolved Universal Terrestrial Radio Access (E-UTRA); Physical channels and modulation (Release 13)," 3GPP TS 36.211 V13.1.0 (Mar. 2016).
Third Generation Partnership Project, "Technical Specification Group Radio Access Network; Evolved Universal Terrestrial Radio Access (E-UTRA); Physical channels and modulation (Release 13)," 3GPP TS 36.211 V13.5.0 (Mar. 2017).
Third Generation Partnership Project, "Technical Specification Group Radio Access Network; Evolved Universal Terrestrial Radio Access (E-UTRA); Physical channels and modulation (Release 14)," 3GPP TS 36.211 V14.2.0 (Mar. 2017).
Third Generation Partnership Project, "Technical Specification Group Radio Access Network; Evolved Universal Terrestrial Radio Access (E-UTRA); Multiplexing and channel coding (Release 12)," 3GPP TS 36.212 V13.0.0 (Dec. 2015).
Third Generation Partnership Project, "Technical Specification Group Radio Access Network; Evolved Universal Terrestrial Radio Access (E-UTRA); Multiplexing and channel coding (Release 13)," 3GPP TS 36.212 V13.1.0 (Mar. 2016).
Third Generation Partnership Project, "Technical Specification Group Radio Access Network; Evolved Universal Terrestrial Radio Access (E-UTRA); Multiplexing and channel coding (Release 13)," 3GPP TS 36.212 V13.5.0 (Mar. 2017).
Third Generation Partnership Project, "Technical Specification Group Radio Access Network; Evolved Universal Terrestrial Radio Access (E-UTRA); Multiplexing and channel coding (Release 14)," 3GPP TS 36.212 V14.2.0 (Mar. 2017).
Third Generation Partnership Project, "Technical Specification Group Radio Access Network; Evolved Universal Terrestrial Radio Access (E-UTRA); Physical layer procedures (Release 13)," 3GPP TS 36.213 V13.0.1 (Jan. 2016).
Third Generation Partnership Project, "Technical Specification Group Radio Access Network; Evolved Universal Terrestrial Radio Access (E-UTRA); Physical layer procedures (Release 13)," 3GPP TS 36.213 V13.1.0 (Mar. 2016).
Third Generation Partnership Project, "Technical Specification Group Radio Access Network; Evolved Universal Terrestrial Radio Access (E-UTRA); Physical layer procedures (Release 13)," 3GPP TS 36.213 V13.5.0 (Mar. 2017).
Third Generation Partnership Project, "Technical Specification Group Radio Access Network; Evolved Universal Terrestrial Radio Access (E-UTRA); Physical layer procedures (Release 14)," 3GPP TS 36.213 V14.2.0 (Mar. 2017).
Iaesi et al., "Requirements for the architecture of 5G cellular networks," 3GPP TSG RAN ad hoc, RPa160028, Barcelona, Spain (Jan. 28-29, 2016).
LG Electronics, "Discussion on UE autonomous resource allocation mechanism for PC5-based V2V," 3GPP TSG RAN WG1 Meeting #84, R1-160634, St Julian's, Malta (Feb. 15-19, 2016).
Qualcomm Incorporated, "Mobility for UEs supporting CIOT optimisations," SA WG2 Meeting #113, S2-160404, Frigate Bay, St. Kitts and Nevis (Jan. 25-30, 2016).

(56) References Cited

OTHER PUBLICATIONS

Samsung, "Enhancement on TRP based resource allocation," 3GPP TSG RAN WG1 #84, R1-160574, St Julian's, Malta (Feb. 15-19, 2016).
Third Generation Partnership Project, "Technical Specification Group GSM/EDGE Radio Access Network; General Packet Radio Service (GPRS); Mobile Station (MS)—Base Station System (BSS) interface; Radio Link Control / Medium Access Control (RLC/MAC) protocol (Release 13)," 3GPP TS 44.060 V13.1.0 (Feb. 2016).
Third Generation Partnership Project, "Technical Specification Group Radio Access Network; General Packet Radio Service (GPRS); Mobile Station (MS)—Base Station System (BSS) interface; Radio Link Control / Medium Access Control (RLC/MAC) protocol (Release 13)," 3GPP TS 44.060 V13.5.0 (Mar. 2017).
Third Generation Partnership Project, "Technical Specification Group Radio Access Network; General Packet Radio Service (GPRS); Mobile Station (MS)—Base Station System (BSS) interface; Radio Link Control / Medium Access Control (RLC/MAC) protocol (Release 14)," 3GPP TS 44.060 V14.0.0 (Mar. 2017).
$3^{rd}$ Generation Partnership Project (3GPP), "Multiplexing of eMBB and URLLC", ZTE, ZTE Microelectronics, 3GPP TSG RAN WG1, Meeting #86, R1-166408, Gothenburg, Sweden, Aug. 22-26, 2016, 10 pages.
$3^{rd}$ Generation Partnership Project (3GPP), "Channel coding schemes for eMBB and URLLC Coexistence", Sharp, MTI, 3GPP TSG RAN WG1, Meeting #86, R1-167617, Gothenburg, Sweden, Aug. 22-26, 2016, 10 pages.
3GPP TS 25.331 V8.3.1, "Radio Resource Control (RRC); Protocol Specification", Release 8, Aug. 2008, 1494 pages.
3GPP TS 36.331 V1.0.0, "Evolved Universal Terrestrial Radio Access (E-UTRA) Radio Resource Control (RRC);", Protocol Specification, Release 8, Nov. 2007, 58 pages.

\* cited by examiner

METHOD AND APPARATUS FOR PERFORMING PHYSICAL LAYER MOBILITY PROCEDURES

CROSS-REFERENCE TO RELATED APPLICATIONS

This application is the U.S. National Stage, under 35 U.S.C. § 371, of International Application No. PCT/US2017/024936 filed Mar. 30, 2017, which claims the benefit of U.S. Provisional Application No. 62/315,080, filed Mar. 30, 2016, and U.S. Provisional Application No. 62/334,630, filed May 11, 2016, the contents of both of which are hereby incorporated herein by reference in their entirety.

BACKGROUND

Mobile communications are in continuous evolution and are already at the doorstep of its fifth incarnation—5G. As with previous generations, new use cases largely contributed in setting the requirements for the new system. It is expected that the 5G air interface will at least enable the following use cases: (1) improved broadband performance (IBB); (2) industrial control and communications (ICC) and vehicular applications (V2X); and (3) Massive Machine-Type Communications (mMTC). The above uses cases are thus translated into many requirements for the 5G interface that should be balanced and optimized.

SUMMARY

To be Completed Once Claims are Finalized

A method and wireless transmit/receive unit (WTRU) for performing handover among a plurality of coordinated transmission-reception points (TRPs) is disclosed. The method begins by measuring a first reference signal (RS) of a first of the plurality of coordinated TRPs and a second RS of a second of the plurality of coordinated TRPs. Then the WTRU receives a grant to transmit to the coordinated TRPs. Next the WTRU transmits to the first of the plurality of coordinated TRPs; and determines whether to transmit to the second of the plurality of coordinated TRPs rather than the first of the plurality of coordinated TRPs, based on the first RS, the second RS, and a change in circumstances.

A method and WTRU for performing a random access procedure is also disclosed. The method begins by performing random access procedures to a plurality of coordinated TRPs using the same resources for each TRP. Then the WTRU receives at least one random access response (RAR). Based on the received responses, the WTRU selects one random access response of a particular TRP of the plurality of coordinated TRPs to continue the random access procedure, and stores the contents of the remaining access response. Then the WTRU continues the random access procedure with the particular TRP.

BRIEF DESCRIPTION OF THE DRAWINGS

A more detailed understanding may be had from the following description, given by way of example in conjunction with the accompanying drawings wherein.

DETAILED DESCRIPTION

Figure 1A:
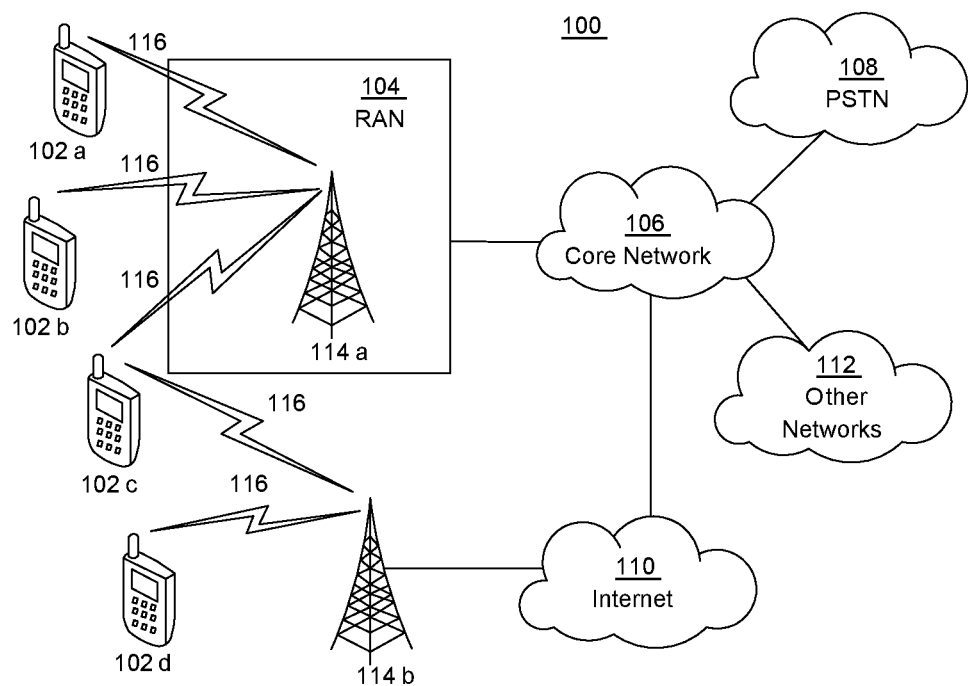
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114*a* and/or the base station 114*b* may be configured to transmit and/or receive wireless signals within a particular geographic region, which may be referred to as a cell (not shown). The cell may further be divided into cell sectors. For example, the cell associated with the base station 114*a* may be divided into three sectors. Thus, in one embodiment, the base station 114*a* may include three transceivers, i.e., one for each sector of the cell. In another embodiment, the base station 114*a* may employ multiple-input multiple-output (MIMO) technology and, therefore, may utilize multiple transceivers for each sector of the cell.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114*a* and the WTRUs 102*a*, 102*b*, 102*c* may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114*b* and the WTRUs 102*c*, 102*d* may implement a radio technology such as IEEE 802.11 to establish a wireless local area network (WLAN). In another embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, etc.) to establish a picocell or femtocell. As shown in FIG. 1A, the base station 114*b* may have a direct connection to the Internet 110. Thus, the base station 114*b* may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102*a*, 102*b*, 102*c*, 102*d*. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102*a*, 102*b*, 102*c*, 102*d* in the communications system 100 may include multi-mode capabilities, i.e., the WTRUs 102*a*, 102*b*, 102*c*, 102*d* may include multiple transceivers for communicating with different wireless networks over different wireless links. For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
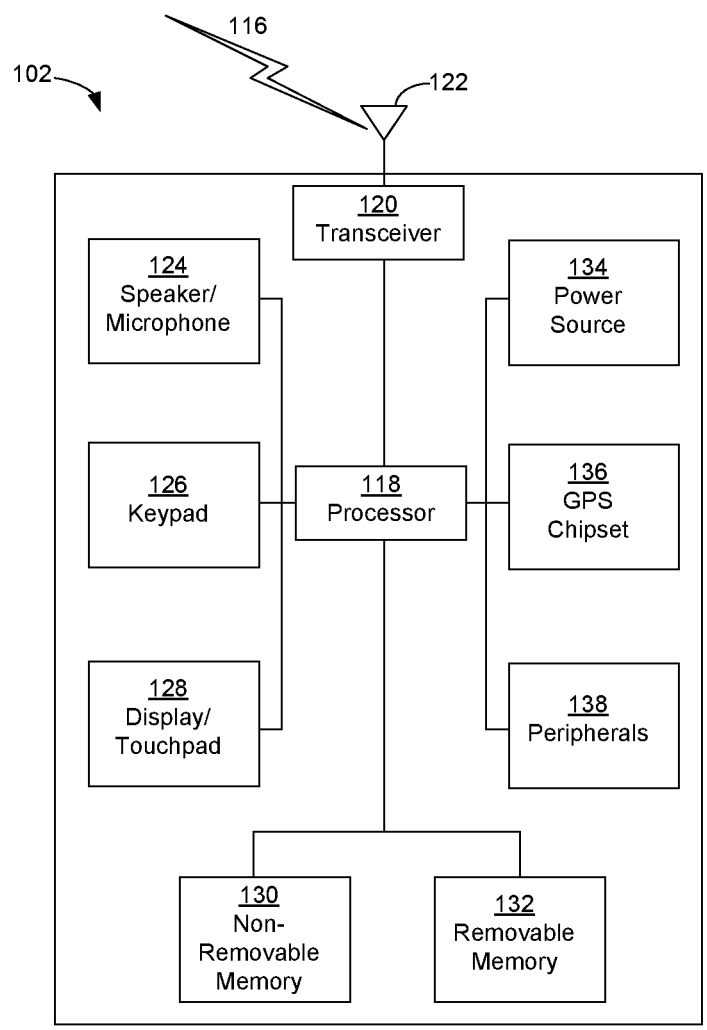
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
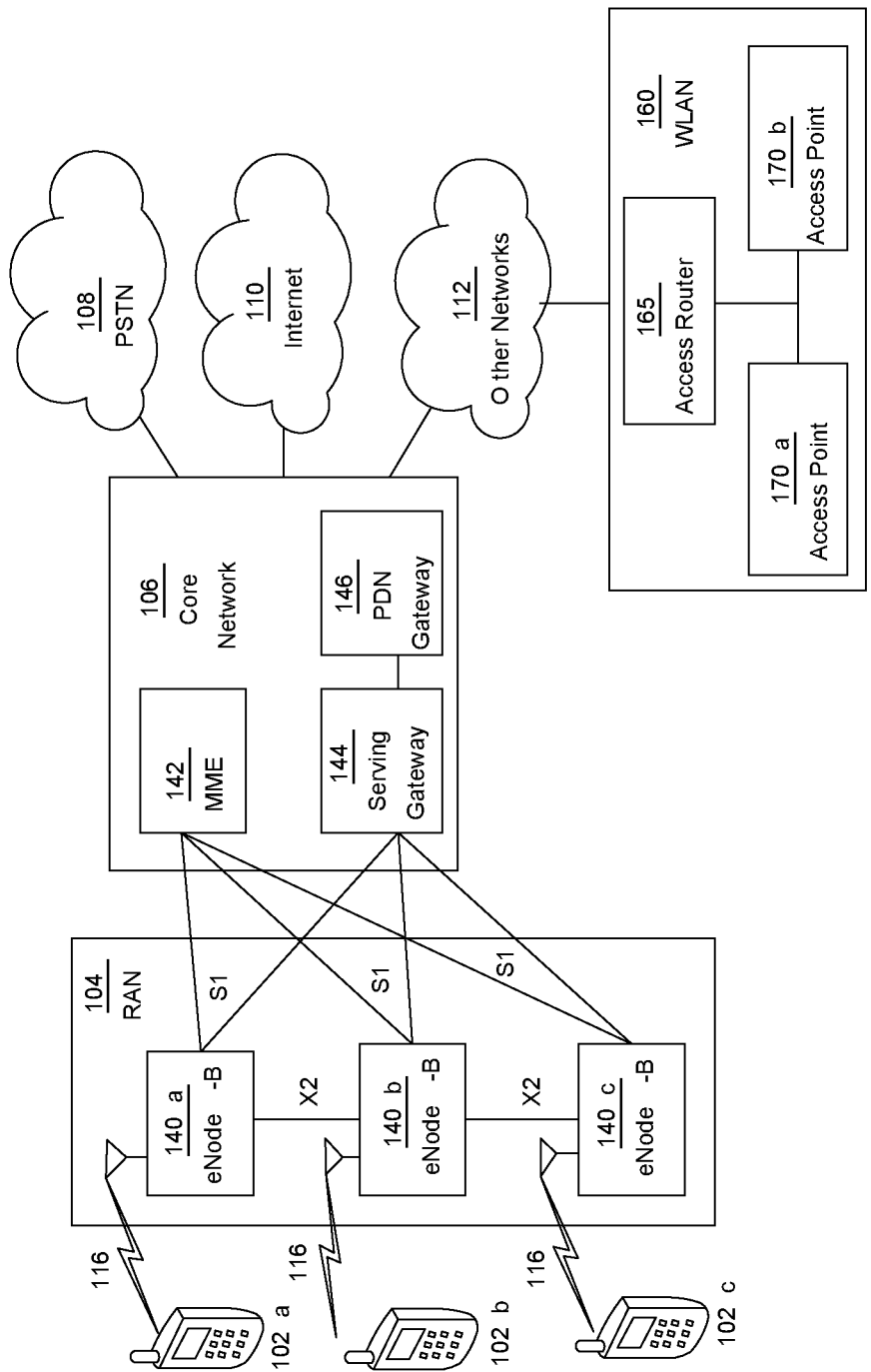
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the Si interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Other network 112 may further be connected to an IEEE 802.11 based wireless local area network (WLAN) 160. The WLAN 160 may include an access router 165. The access router may contain gateway functionality. The access router 165 may be in communication with a plurality of access points (APs) 170a, 170b. The communication between access router 165 and APs 170a, 170b may be via wired Ethernet (IEEE 802.3 standards), or any type of wireless communication protocol. AP 170a is in wireless communication over an air interface with WTRU 102d.

The following abbreviations and acronyms may be referred to herein:

Δf Sub-carrier spacing
5gFlex 5G Flexible Radio Access Technology
5gNB 5GFlex NodeB
ACK Acknowledgement
BLER Block Error Rate
BTI Basic TI (in integer multiple of one or more symbol duration)
CB Contention-Based (e.g. access, channel, resource)
CoMP Coordinated Multi-Point transmission/reception
CP Cyclic Prefix
CP-OFDM Conventional OFDM (relying on cyclic prefix)
CQI Channel Quality Indicator
CN Core Network (e.g. LTE packet core)
CRC Cyclic Redundancy Check
CSI Channel State Information
D2D Device to Device transmissions (e.g. LTE Sidelink)
DCI Downlink Control Information
DL Downlink
DM-RS Demodulation Reference Signal
DRB Data Radio Bearer
EPC Evolved Packet Core
FBMC Filtered Band Multi-Carrier
FBMC/OQAM A FBMC technique using Offset Quadrature Amplitude Modulation
FDD Frequency Division Duplexing
FDM Frequency Division Multiplexing
ICC Industrial Control and Communications
ICIC Inter-Cell Interference Cancellation
IP Internet Protocol
LAA License Assisted Access
LBT Listen-Before-Talk
LCH Logical Channel
LCP Logical Channel Prioritization
LTE Long Term Evolution e.g. from 3GPP LTE R8 and up
MAC Medium Access Control
NACK Negative ACK
MC MultiCarrier
MCS Modulation and Coding Scheme
MIMO Multiple Input Multiple Output
MTC Machine-Type Communications
NAS Non-Access Stratum
OFDM Orthogonal Frequency-Division Multiplexing
OOB Out-Of-Band (emissions)
$P_{cmax}$ Total available WTRU power in a given TI
PHY Physical Layer
PRACH Physical Random Access Channel
PRB Physical Resource Block
PRG Precoding Resource Group
PDU Protocol Data Unit
PER Packet Error Rate
PLR Packet Loss Rate
PMI Precoding Matrix Indicator
PTI Precoding Type Indicator
QoS Quality of Service (from the physical layer perspective)
RAB Radio Access Bearer
RACH Random Access Channel (or procedure)
RF Radio Front end
RNTI Radio Network Identifier
RRC Radio Resource Control
RRM Radio Resource Management
RS Reference Signal
RTT Round-Trip Time
SCMA Single Carrier Multiple Access
SDU Service Data Unit
SOM Spectrum Operation Mode
SS Synchronization Signal
SRB Signalling Radio Bearer
SWG Switching Gap (in a self-contained subframe)
TB Transport Block
TDD Time-Division Duplexing
TDM Time-Division Multiplexing
TI Time Interval (in integer multiple of one or more BTI)
TTI Transmission Time Interval (in integer multiple of one or more TI)
TRx Transceiver
UFMC Universal Filtered MultiCarrier
UF-OFDM Universal Filtered OFDM
UL Uplink
V2V Vehicle to vehicle communications
V2X Vehicular communications
WLAN Wireless Local Area Networks and related technologies (IEEE 802.xx domain)

In LTE a WTRU may be configured to perform higher-layer measurements that may enable mobility. A WTRU may perform measurements on a cell-specific reference signal (CRS), either in a discovery reference signal (DRS) or transmitted periodically. Furthermore, the WTRU may perform measurements on symbols within a DRS or symbols of a CRS. A WTRU may be configured to obtain measurements and to report the results.

A WTRU may be configured to report measurements on the basis of one or more measurement based trigger. A WTRU may be configured to obtain and report a Reference Signal Received Power (RSRP) measurement. To obtain the RSRP, the WTRU measures the received power on a CRS. A WTRU may also be configured to obtain and report a CSI-RSRP measurement. To obtain a CSI-RSRP, the WTRU may be configured to measure received power on a CSI-RS resource. A WTRU may be configured to obtain and report a Reference Signal Strength Indicator (RSSI) measurement. The RSSI may be a measure of total power observed on a complete symbol. The complete symbol may be a symbol with CRS, or may be all symbols of a subframe containing CRS. A WTRU may be configured to obtain and report a Reference Signal Received Quality (RSRQ) measurement. The RSRQ may be obtained as a function of RSRP and RSSI measurement. If the RSRQ is a function of RSRP and RSSI, RSSI would serve as a proxy to determine an amount of average interference on a frequency.

In LTE, a WTRU may blindly detect PSS/SSS to determine the presence of a cell. From the PSS/SSS a WTRU may acquire frequency and symbol synchronization of a cell, acquire frame timing of a cell and determine the physical-layer cell identity. Based on the physical-layer cell identity, the WTRU may determine a CRS configuration. The CRS enables the WTRU to perform measurements on a cell and also to demodulate transmissions from the cell.

A WTRU may also acquire system information from a cell. System information can be split up into parts, which may include the Master-Information Block (MIB) and System-Information Blocks (SIBs). The MIB may be transmitted using a broadcast channel (BCH). SIBs may be transmitted using a downlink shared channel (DL-SCH).

From the MIB, a WTRU may determine information about the cell's DL bandwidth, information about a PHICH configuration and a System Frame Number (SFN). From SIBs, a WTRU may determine whether it can access a cell. The WTRU may also obtain information to access the cell from the SIBs. Information to access the cell may include UL cell bandwidth, random-access parameters and parameters related to UL power control.

A WTRU may perform Random Acces (RA) to a cell for different purposes. RA may be used for initial access, such as when establishing a radio link to the cell. RA may also be used to re-establish a radio link with the cell after an initial link fails RA may also be used to establish UL synchronization, or for handover, when UL synchronization is needed. RA may also be used for positioning, or RA may be used as a scheduling request.

Random Access may be performed by a WTRU, which would begin an RA session by transmitting a preamble on PRACH resources to a cell. The cell may detect the preamble transmission. If so, the cell transmits a Random-access Response (RAR). A RAR may contain an index of an RA preamble, the network detected, a timing correction, a scheduling grant to be used by the WTRU , and a temporary identity for further communication between the WTRU and the network. The WTRU then transmits the necessary messages to the eNB using UL-SCH resources assigned in the RAR. UL-SCH resources may include a terminal identity, which may be used to enable contention-resolution, which may be required. Contention resolution would then occur, which may include sending a message on PDCCH using a WTRU's identity, or may include DL-SCH with a terminal identity.

A 5G air interface may require support for improved broadband performance (IBB) over previous generation networks. A 5G air interface may also require support for Industrial Control and Communications (ICC) or Vehicular Applications (V2X). A 5G air interface may also be expected to support Massive Machine-Type Communications (mMTC).

A 5G interface may also require support for baseband filtering of frequency-domain waveform. In designing an interface for this potential requirement, it may be beneficial for baseband filtering of the frequency-domain waveform to have the ability to enable effective aggregation of up to 150-200 MHz total spectrum within a given RF transceiver path without relying on a re-design of the front end of the interface.

a 5G interface may be implemented using spectrum across widely separated operating bands (e.g. 900 MHz and 3.5 GHz), which may require multiple RF transceiver chains. These may be necessary because of antenna size requirements and amplifier optimization design constraints which may be different across different operating bands. This could result in a need for multiple antennae within a WTRU device. For example, a WTRU designed to operate in 5G networks at different frequencies may require three separate RF transceiver paths: for example, one below 1 GHz, a another for the 1.8-3.5 GHz frequency range and a another covering the 4-6 GHz frequency range. Native built-in support for Massive MIMO antenna configurations is an important second order requirement as well.

5G systems may also support ultra-low transmission latency, such as, air interface latency as low as 1 ms RTT. A latency requirement such as this may require support for TTIs between 100 us and 250 us. Additionally, support for ultra-low access latency, which is time from initial system access until the completion of the transmission of the first user plane data unit, may also be required or desired. For example, an end-to-end (e2e) latency of less than 10 ms may be required.

5G systems may also support transmission reliability that is lower, perhaps substantially lower, than what is possible with LTE systems. 99.999% transmission success and service availability may be required or desired. Support for mobility for speed in the range of 0-500 km/h may also be required, as may reduced Packet Loss Rate, such as a rate of less than $10e^{-6}$.

5G systems may also support MTC operation (including narrowband operation). A 5G network may also support narrowband operation, for example, using less than 200 KHz) Extended battery life, perhaps extending years, may also be supported. Reducing communication overhead for small and infrequent data transmissions may also be supported, potentially including low data rate in the range of 1-100 kbps, with access latency of seconds to hours.

mMTC may require the system to support narrowband operation. The resulting link budget should be comparable to that of LTE extended coverage, but the system will support a very large number of MTC devices, potentially up to 200,000 devices per square kilometer, without adverse impact on spectral efficiency for other supported services.

The above set of requirements can be met by designing the 5G network in accordance with design features as described herein. For example, a 5G system may be designed to enable flexible spectrum usage, deployment strategies and operation. The system may be designed to support spectrum of varying size, perhaps using multiple frequency ranges simultaneously or in rapid succession, and may include use of multiple carrier networks that may be in the same and/or in different frequency bands, and may be licensed, unlicensed or a mixture of both. The system may also support narrowband and wideband operation, different duplexing methods, dynamically variable DL/UL allocation, variable TTI lengths, scheduled and unscheduled transmissions, synchronous and asynchronous transmissions, separation of user plane from the control plane, and multi-node connectivity.

A 5G system may also be designed to integrate with legacy (E−) UTRAN and EPC/CN aspects. Although the system may not require backward compatibility, the system may be required to integrate and/or interoperate with the legacy interfaces, or evolutions of legacy interfaces, which may include legacy CN, such as the S1 interface or NAS, and eNBs such as an X2 interface and dual connectivity with LTE. The system may also be required to enable legacy aspects of prior generation networks, such as support for existing QoS and security mechanisms.

Some elements of the 5G design could be retrofitted in LTE Evolution, which would allow for backward compatibility of some or all components. For example, TTIs shorter than a 0.5 ms LTE slot, using a different waveform to enable ultra-low latency, may be used. Support for D2D/Sidelink operation may also be implemented. Support for LAA operation using LBT; and Support for relaying may also be implemented.

OFDM is the basic signal format for data transmissions in both LTE and in IEEE 802.11 networks. OFDM efficiently divides the spectrum into multiple parallel orthogonal sub-bands. Each subcarrier is shaped using a rectangular window in the time domain, leading to sinc-shaped subcarriers in the frequency domain. Because of this, OFDMA requires perfect frequency synchronization and tight management of uplink timing alignment within the cyclic prefix, which maintains orthogonality between signals and minimize inter-carrier interference. This kind of tight synchronization may not be well-suited in a system where a WTRU is connected to multiple access points simultaneously. Additional power reduction may also be applied to uplink transmissions for compliance with spectral emission requirements to adjacent bands, which may be helpful in dealing with fragmented spectrum for the WTRU's transmissions.

Some of the shortcomings of conventional OFDM (CP-OFDM) may be addressed by more stringent RF requirements for implementations, which may be helpful when operating using a large amount of contiguous spectrum not requiring aggregation. A CP-based OFDM transmission scheme could also lead to a downlink physical layer for 5G, which would be similar to that of legacy systems, perhaps changed mainly with respect to pilot signal density and location.

Because of the differences in needs and use cases between a new 5G network and legacy systems, including fragmented spectrum allocation, a 5gFLEX design focuses on other waveform candidates. However, conventional OFDM remains a possible candidate for 5G systems, at least for the downlink transmission scheme. Building upon OFDMA and legacy LTE systems, a design for flexible radio access for 5G is proposed herein.

A 5gFLEX downlink transmission scheme is based on a multicarrier waveform characterized by high spectral containment with lower side lobes and lower OOB emissions. Possible MC waveform candidates for 5G include OFDM-OQAM and UFMC (UF-OFDM).

Multicarrier modulation waveforms may divide a channel into subchannels and modulate data symbols on subcarriers in these subchannels. With OFDM-OQAM, a filter may be applied in the time domain per subcarrier to the OFDM signal, to reduce OOB. OFDM-OQAM causes low interference to adjacent bands, does not need large guard bands, and does not require a cyclic prefix. However, OFDM-OQAM is sensitive to multipath effects and to high delay spread in terms of orthogonality thereby complicating equalization and channel estimation.

With UFMC (UF-OFDM), a filter may also be applied to the OFDM signal in the time domain, to reduce OOB. Filtering is applied per subband to use spectrum fragments, thereby reducing complexity. However, if there are unused spectrum fragments in the band, OOB emissions in these fragments will remain as high as for conventional OFDM. In other words, UF-OFDM improves over OFDM only at the edges of the filtered spectrum. Improvements are not seen in the spectral hole.

Methods described herein are not limited to the above waveforms and may be applicable to other waveforms. The waveforms described above will be further used herein, with the understanding that they are examples only. Such waveforms may enable multiplexing in frequency of signals with non-orthogonal characteristics, such as different subcarrier spacing, and co-existence of asynchronous signals without requiring complex interference cancellation receivers. The methods may also facilitate the aggregation of fragmented pieces of spectrum in the baseband processing as a lower cost alternative to their implementation as part of RF processing.

Different waveforms co-existing within the same band may be considered, for example support for mMTC narrow-band operation using SCMA may be considered. Another example of different waveforms co-existing in the same band may be the support, within the same band, of a combination of different waveforms, perhaps including CP-OFDM, OFDM-OQAM and UF-OFDM, for all aspects and for both downlink and uplink transmissions. This co-existence may include transmissions using different types of waveforms between different WTRUs, or transmissions from the same WTRU either simultaneously with some overlap, or consecutive in the time domain.

Other ways to improve co-existence may include support for hybrid types of waveforms, including waveforms and/or transmissions that support at least one of a possibly varying CP duration, for example from one transmission to another. A combination of a CP and a low power tail (e.g. a zero tail) may also improve co-existence. A form of hybrid guard interval may improve co-existence, and may include using a low power CP and an adaptive low power tail. Similar improvements may also be used. Waveforms may support dynamic variation and/or control of further design options, which may include filtering options such as whether filtering is applied at the edge of the spectrum used for reception of any transmissions for a given carrier frequency, at the edge of a spectrum used for reception of a transmission associated to a specific SOM, or per subband, or per group thereof. An uplink transmission scheme may use a same or different waveform as for downlink transmissions. Multiplexing of transmissions to and from different WTRUs in the same cell may be based on FDMA and TDMA.

5gFLEX radio access design may be characterized by spectrum flexibility, which enables deployment in different frequency bands with different characteristics, including different duplex arrangements. Different and/or variable sizes of the available spectrum, including contiguous and non-contiguous spectrum allocations in the same or different bands, may also be used. Radio access design may also support variable timing aspects, including support for multiple TTI lengths and support for asynchronous transmissions.

TDD and/or FDD duplexing schemes may be supported. For FDD operation, supplemental downlink operation may be supported using spectrum aggregation. FDD operation may support full-duplex FDD, half-duplex FDD operation, or both. For TDD operation, the DL/UL allocation is dynamic and is not based on a fixed DL/UL frame configuration. The length of a DL or a UL transmission interval may be set on a per transmission opportunity basis.

Figure 2:
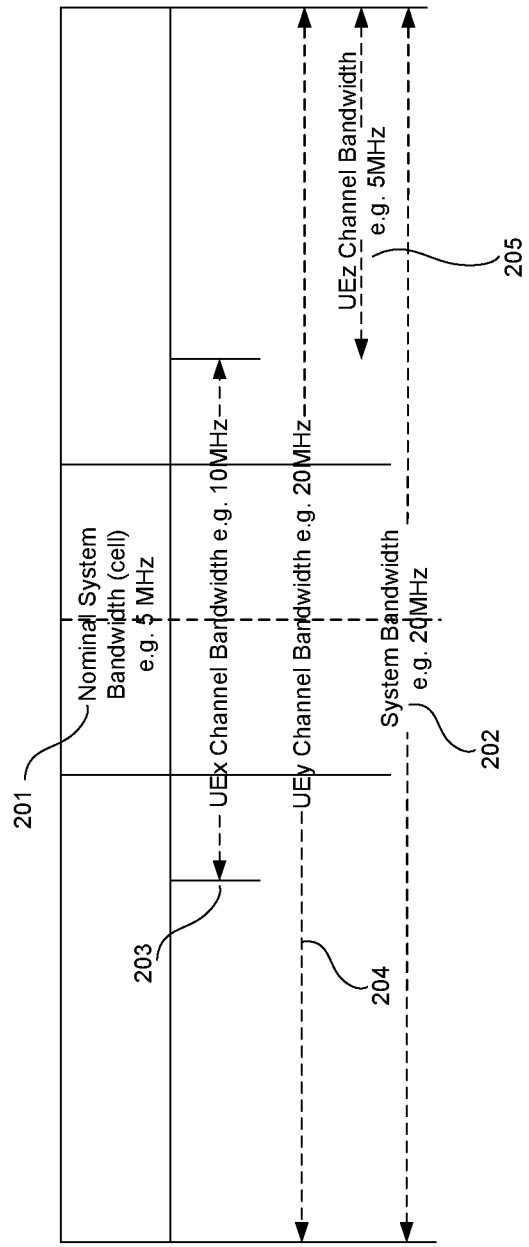
FIG. 2 is a block diagram of an example of different transmission bandwidths.

In FIG. 2 an example of different transmission bandwidths is shown. 5gFLEX design may allow for the possibility of different transmission bandwidths on uplink, downlink, or both. Bandwidth may range from nominal system bandwidth 201, shown in FIG. 2 as 5 MHz, up to the system bandwidth 202, shown as 20 Mhz. Three examples of UE channel bandwidth are shown, with UEx channel bandwidth 203 shown at 10 MHz, UEy channel bandwidth 204 shown at 20 MHz, and UEz channel bandwidth 205 shown at 5 MHz. Other UE channel bandwidths may also be used between nominal bandwidth 201 and system bandwidth 202.

For single carrier operation, the supported system bandwidths 202 may include at least 5, 10, 20, 40 and 80 MHz. Supported system bandwidths may be any bandwidth within a range, which can be from a few MHz up to 160 MHz. Nominal bandwidths 201 could have one or more fixed possible values. Narrowband transmissions of up to 200 KHz may be supported within the operating bandwidth for MTC devices.

System bandwidth 202 herein may refer to the largest portion of spectrum that can be managed by the network for a carrier. For the carrier, the portion that a WTRU minimally supports for cell acquisition, measurements and initial access to the network may correspond to the nominal system bandwidth 201. The WTRU may be configured with a channel bandwidth 203, 204, or 205 that is within the range of the entire system bandwidth 202. The WTRU's configured channel bandwidth may or may not include the nominal part of the system bandwidth as shown in FIG. 2, where UEx channel bandwidth 203 and UEy channel bandwidth 204 include the nominal part of the system bandwidth 201, but UEz channel bandwidth 205 uses a different 5 MHz band than the 5 MHz of the nominal system bandwidth 201.

Bandwidth flexibility can be achieved, because all applicable sets of RF requirements, for a given maximum operating bandwidth in a band, can be met without introducing additional allowed channel bandwidths for that operating band. Efficient support of baseband filtering of the frequency domain waveform assists in achieving bandwidth flexibility.

A 5gFLEX physical layer may be band-agnostic and may support operation in licensed bands below 5 GHz and/or unlicensed bands in the range of 5-6 GHz. For operation in unlicensed bands, LBT Cat 4 based channel access framework similar, to LTE LAA, may be supported.

Flexible Spectrum Allocation may be achieved. Downlink control channels and signals may support FDM operation. A WTRU may acquire a downlink carrier by receiving transmissions using only the nominal part of the system bandwidth. For example, the WTRU may not initially need to receive transmissions covering the entire bandwidth that is being managed by the network for a particular carrier.

Downlink data channels may be allocated over a bandwidth that may or may not correspond to the nominal system bandwidth, without restrictions other than being within the WTRU's configured channel bandwidth. For example, the network may operate a carrier with a 12 MHz system bandwidth using a 5 MHz nominal bandwidth. This would allow WTRUs that only support 5 MHz maximum RF bandwidth to acquire and access the system, but also allocate +10 to −10 MHz of the carrier frequency to other WTRU's supporting up to 20 MHz worth of channel bandwidth.

Figure 3:
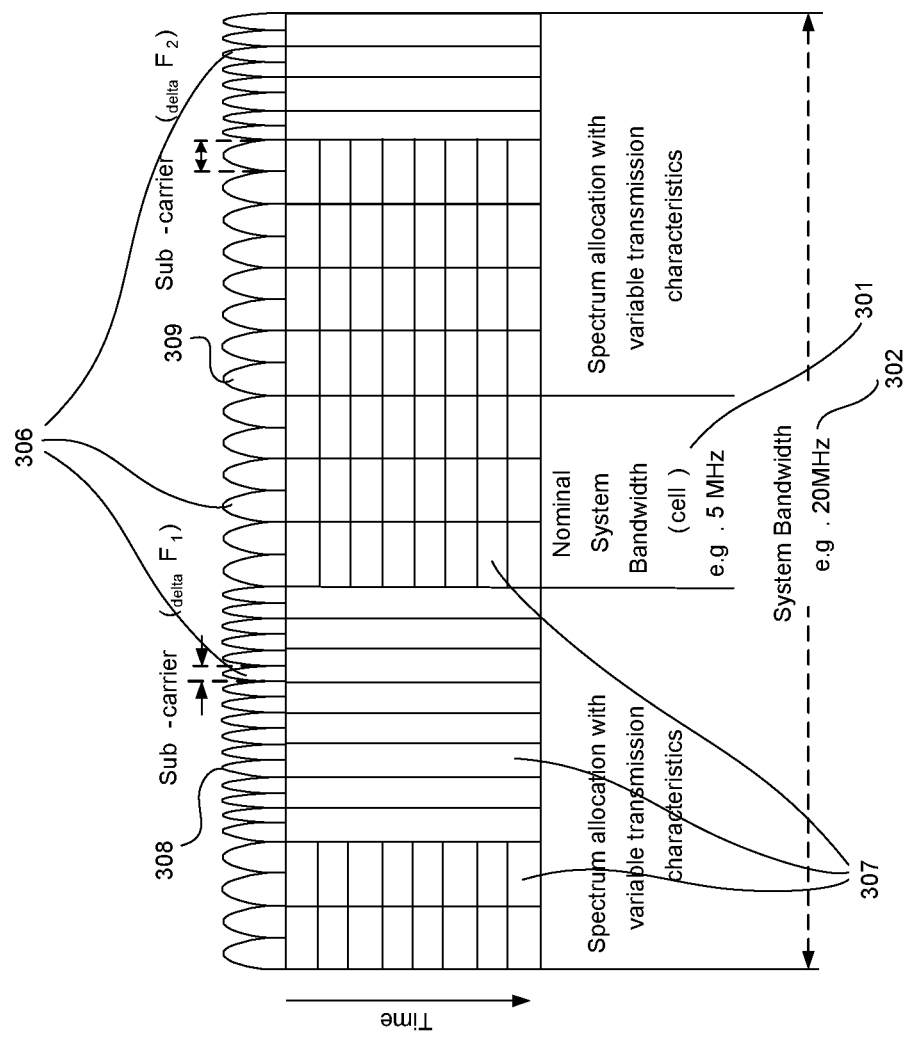
FIG. 3 is a block diagram of a system bandwidth utilizing a flexible spectrum allocation.

FIG. 3 is an example of a spectrum allocation where different subcarriers with subcarrier spacing 306 may be at least conceptually assigned to different modes of operation (also known as Spectrum Operation Modes, hereafter SOM). Different SOM may be used to fulfill different requirements for different transmission characteristics 307. A SOM may be defined by a subcarrier spacing 306, with examples shown as subcarrier spacing $F_1$ 308 and subcarrier spacing $F_2$ 309. A SOM may also be defined by a TTI length. A SOM may also be defined by one or more reliability features, which may include HARQ processing or a secondary control channel. In some cases, a SOM may be used to refer to a specific waveform or may be related to a processing feature, which may be used in support of co-existence of different waveforms in the same carrier using FDM and/or TDM. Processing features may also be used when coexistence of FDD operation in a TDD band is supported, which may be in a TDM manner or a similar manner. Variable transmission characteristics 307 may also be used within the nominal system bandwidth 301 and/or the system bandwidth 302.

A single carrier operation may support spectrum aggregation, whereby the WTRU supports transmission and reception of multiple transport blocks over contiguous or non-contiguous sets physical resource blocks (PRBs) within the same operating band. Mapping of a single transport block to separate sets of PRBs may also be used to achieve support for spectrum aggregation.

Multicarrier operation may also be supported using contiguous or non-contiguous spectrum blocks within the same operating band, or across two or more operating bands. Aggregation of spectrum blocks using different modes such as FDD and TDD, or using different channel access methods i.e. licensed and unlicensed band operation below 6 GHz is supported.

Methods that configure, reconfigure and/or dynamically change the WTRU's multicarrier aggregation may be helpful in supporting aggregation of the frequency bands for multiple carriers in a single WTRU. Flexible Framing, Timing, and Synchronization may be one manner of dynamic reconfiguration.

Figure 4:
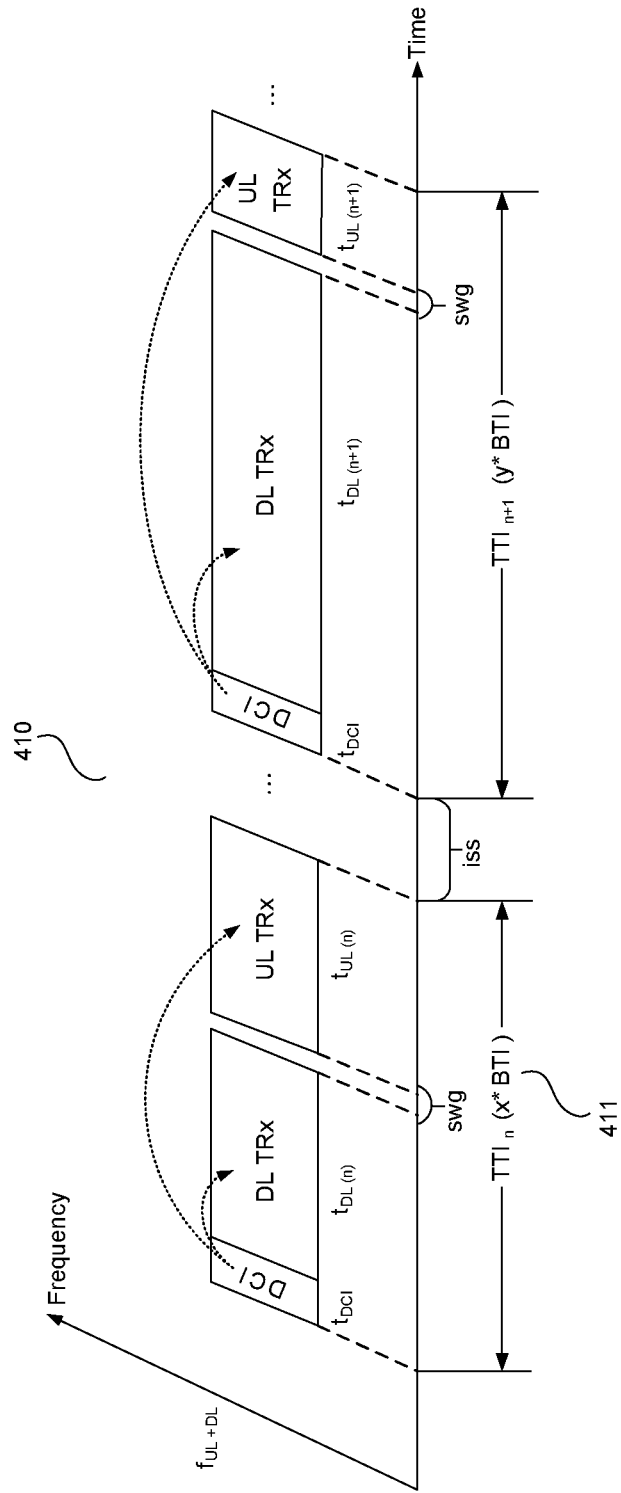
FIG. 4 is a block diagram of a frame structure and timing relationships for TDD duplexing.
Figure 5:
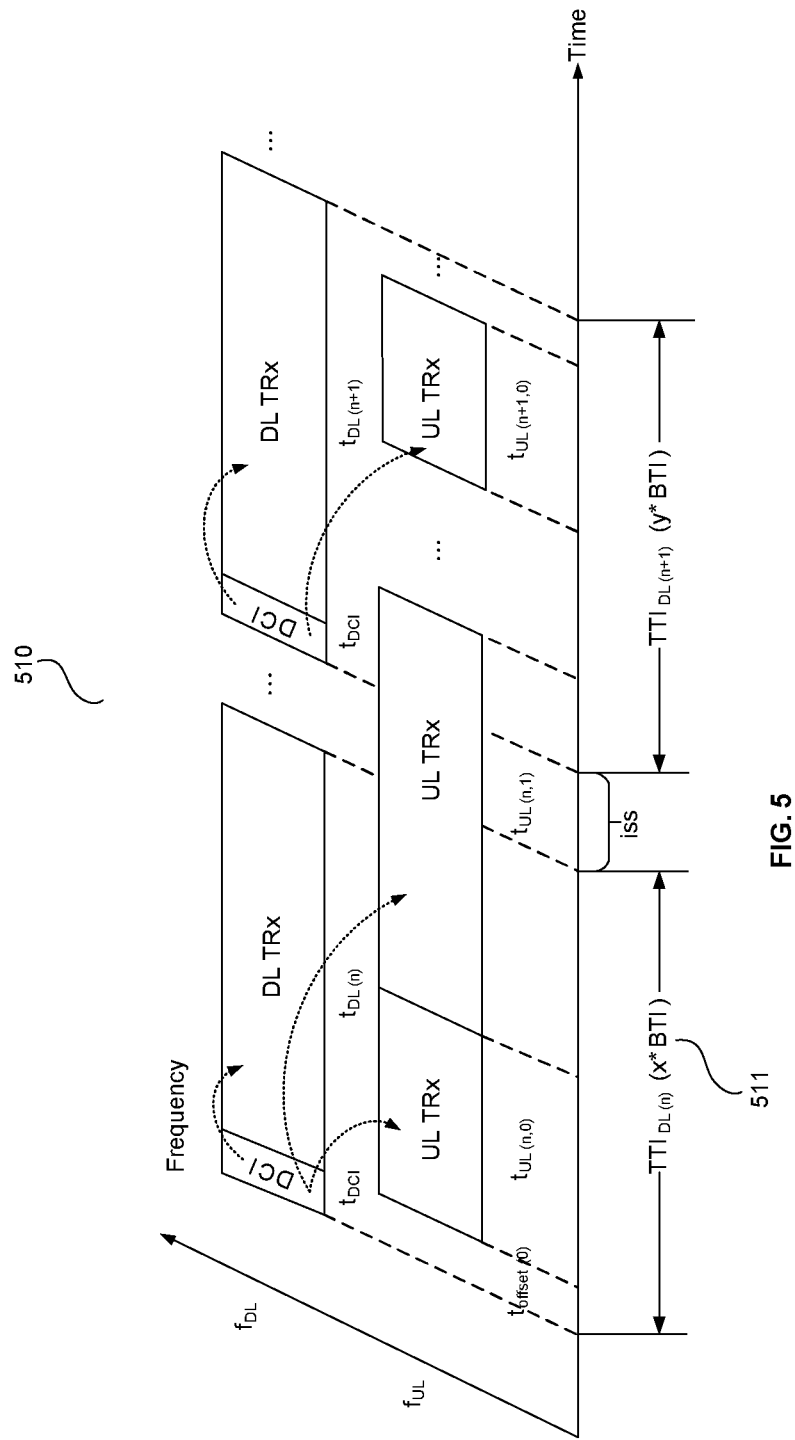
FIG. 5 is a block diagram of a frame structure and timing relationships for TDD duplexing.

Examples of frame structure for Flexible Framing, Timing and Synchronization are shown in FIG. 4, for TDD and FIG. 5 for FDD. Downlink and uplink transmissions may be organized into radio frames 410/510, which are characterized by fixed characteristics, such as location of downlink control information, and/or characteristics that vary, such as transmission timing or supported types of transmissions.

Basic time interval (BTI) 411/511 is expressed in terms of an integer number of one or more symbols, the duration of which may be a function of subcarrier spacing applicable to a time-frequency resource. For FDD, subcarrier spacing may differ between uplink carrier frequency $f_{UL}$ and downlink carrier frequency $f_{DL}$ for a given frame, as shown in FIG. 5. As shown in FIG. 4 for TDD, $f_{UL}$ and $f_{DL}$ could use the same or a combined subcarrier spacing as shown at $f_{UL+DL}$ . . .

A transmission time interval (TTI) is the minimum time supported by the system between consecutive transmissions, where each would be associated to different transport blocks (TBs), TTIDL for the downlink, and UL TRx for the uplink. Consecutive transmissions may exclude a preamble, and may include downlink control information (DCI) uplink control information UCI. A TTI may be expressed in terms of an integer reflecting a number of one of more BTI(s) 411/511. A BTI 411/511 may be specific to, or associated with, a given SOM.

The method may support frame durations that may be expressed as microseconds or miliseconds, and may include 100 us, 125 us (aka ⅛ ms), or 142.85 us (aka ⅐ ms, which is 2 nCP LTE OFDM symbols). The method may also support a frame duration of 1 ms to enable alignment with the legacy LTE timing structure.

Each frame may start with downlink control information (DCI) of a fixed time duration TDCI, which may precede downlink data transmission (DL TRx) for the carrier frequency: $f_{UL+DL}$ for TDD and $f_{DL}$ for FDD.

For TDD duplexing, a frame may comprise a downlink portion (DCI and DL TRx) and may also include an uplink portion (UL TRx) 219. A switching gap (SWG) may precede the uplink portion of the frame.

For FDD duplexing only, a frame may comprise a downlink reference TTI and one or more TTI(s) for the uplink. The start of an uplink TTI may be derived using an offset ($t_{offset}$) which may be applied from the start of the downlink reference frame that overlaps with the start of the uplink frame.

For TDD, a 5gFLEX network may support D2D/V2x/Sidelink operation in frames, by including respective downlink control and forward direction transmission. Downlink control and forward direction transition may be present in the DCI+DL TRx portion if a semi-static allocation of the respective resources is used. It may only be present in the DL TRx portion if dynamic allocation is used. Frames may also include the respective reverse direction transmission in the UL TRx portion.

For FDD, a 5gFLEX network may support D2D/V2x/Sidelink operation in the UL TRx portion of the frame by including respective downlink control, forward direction and reverse direction transmissions in the UL TRx portion, dynamic allocation of the respective resources may be used.

A scheduling function may be supported in the MAC layer. A network-based scheduling mode may be supported, which may be useful for tight scheduling in terms of resources, timing, and transmission parameters of downlink transmissions and/or uplink transmissions. A WTRU-based scheduling mode may be supported, which may be useful if more flexibility, in terms of timing and transmission parameters, is desired. For both modes, scheduling information may be valid for a single TTI or for multiple TTIs.

Network-based scheduling may enable the network to manage available radio resources assigned to different WTRUs. This may help to optimize the sharing of such resources. Dynamic scheduling may also be supported.

WTRU-based scheduling may enable the WTRU to opportunistically access uplink resources with reduced latency on a per-need basis within a set of shared or dedicated uplink resources. These uplink resources may be assigned by the network either dynamically or statically. Synchronized opportunistic transmissions, and unsynchronized opportunistic transmissions, or both, may be are supported. Contention-based transmissions and contention-free transmissions may also be supported.

Support for opportunistic transmissions may be included. Opportunistic transmissions may be scheduled or unscheduled. Opportunistic transmissions may be helpful to substantially reduce latency and/or save power, which may be helpful in meeting requirements of a 5G network and/or the mMTC use case.

A 5gFLEX network may support Logical Channel Prioritization, which may include the association of data available for transmission and available resources for uplink transmissions. Multiplexing of data with different QoS requirements within the same transport block may be supported.

A transmission may be encoded using a number of different encoding methods for forward error correction and block coding, which may use different encoding methods with different characteristics.

In one example, an encoding method may generate a sequence of information units. Each information unit, or block, may be self-contained, so that an error in the transmission of a first block may not impair the ability of the receiver to decode a second block successfully. This may be useful if the second block is error-free, and/or if sufficient redundancy can be found in the second block, or in a different block for which at least a portion was successfully decoded.

Raptor/fountain codes may be used for encoding, whereby a transmission may consist of a sequence of N raptor codes. One or more such codes may be mapped to one or more transmission "symbols" in time. A "symbol" can correspond to one or more sets of information bits, which may mean one or more octets. Encoding using raptor/fountain codes may be used to add FEC to a transmission, whereby the transmission could use N+1 or N+2 raptor codes (or symbols, assuming a one-to-one raptor code symbol relationship) so that the transmission may be more resilient to the loss of one "symbol," which may occur due to interference, or by puncturing caused by another transmission overlapping in time.

Reference signals may include synchronization signals and cell specific reference signals. System information may include broadcast channels. 5G systems may need to operate with reduced periodic transmission of reference signals and/or system information. Reduction of reference signals and/or system information can have benefits, such as reducing over-all interference levels and/or reducing power consumption at Transmission-Reception Points (TRPs).

Furthermore, it may also be beneficial to reduce signaling overhead for generic WTRU functions, such as mobility. Increased densification of TRPs may greatly affect mobility. However, continuing to use legacy WTRU behavior for mobility could lead to overhead that would negate any gains achievable by ultra-dense deployments of TRPs.

As such, there is a need for a framework enabling a WTRU to maintain connectivity with sets of TRPs. Therefore, there is also a need for WTRUs and TRPs to determine which TRP, in a set of TRPs, is the optimal TRP to serve the WTRU. This need can be met with one or more methods to enable a WTRU to maintain measurements on multiple TRPs with reduced reference signal and system information transmission overhead, so that the optimal serving TRP can be efficiently determined, and re-determined when appropriate. Furthermore, there is a need for a method to enable WTRUs to perform mobility between and within sets of TRPs, with reduced signaling.

Methods are provided herein whereby a WTRU may perform mobility between and within sets of TRPs, without requiring higher-layer control plane transmissions, and with reduced interfacing between TRPs, which reduces over-all latency on the network during a mobility operation. The reduced latency of mobility may create benefits for different scenarios such as eMBB, where lower latency in performing mobility ensures that more time is devoted to high throughput transmission of data, and URLLC, where lower latency in mobility can provide reliability by ensuring WTRUs are always connected to optimal TRPs.

A TRP may include a network element, such as a cell, and/or a WTRU capable of D2D transmission and/or reception. A TRP may also indicate a specific parameter of a network element. For example, a TRP may indicate a beam on which a cell may transmit and/or receive. In another example, a TRP may indicate a set of resources or usage type (e.g. SOM, or eMBB, URLLC, mMTC).

Figure 6:
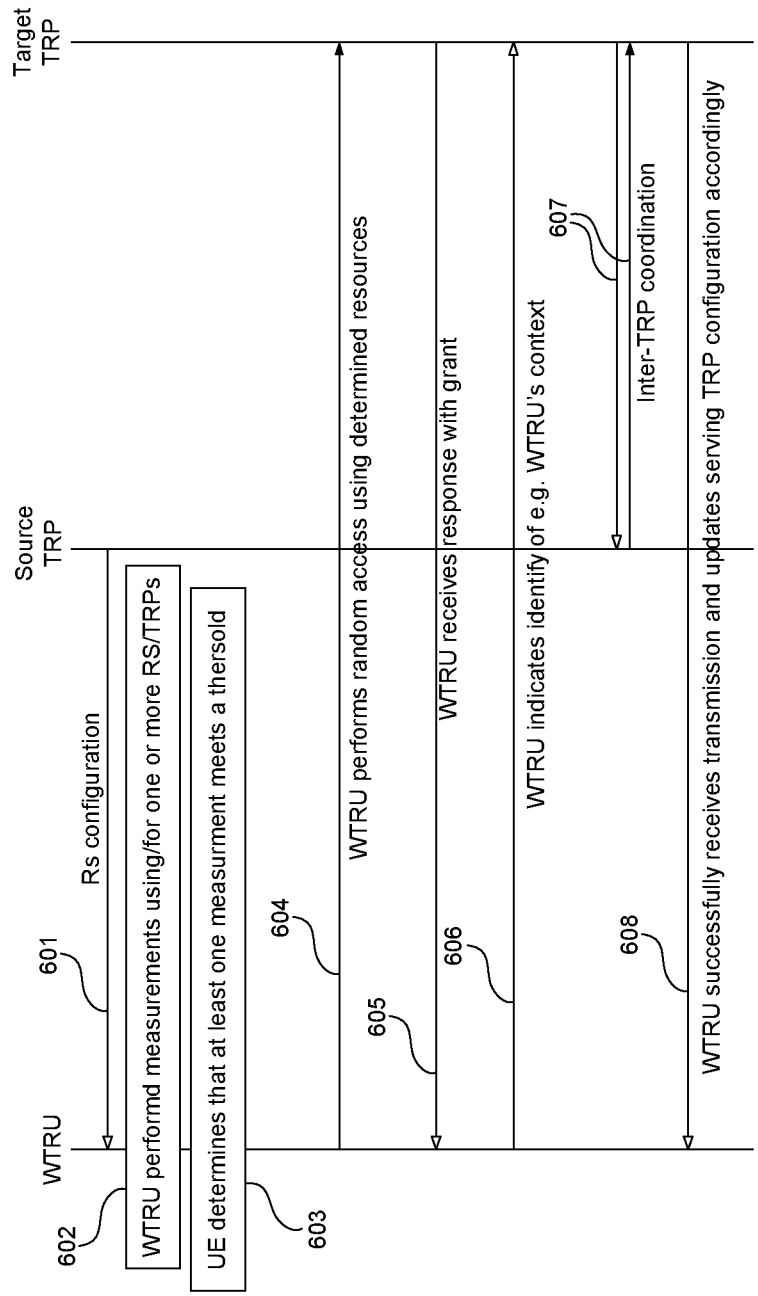
FIG. 6 shows a flow diagram of a mobility process.

FIG. 6 is a flow diagram of a process whereby a WTRU receives RS configuration information from a source TRP, which allows it to transmit to a target TRP. As shown in FIG. 6, RS configuration 601 is sent from a Source TRP to a WTRU. The RS configuration may relate to a group of coordinated TRPs. In block 602, the WTRU performs measurements using one or more RS for one or more TRPs.

Measurements may be of many types, and may relate to the ability of the WTRU to transmit and/or receive to and/or from a serving TRP (for example the Source TRP) and/or a non-serving TRP (for example, a Target TRP). Specific types of measurements are discussed below. In block 603, the WTRU determines that at least one measurement meets a threshold. In block 604, the WTRU performs random access with a target TRP, possibly using resources determined from the measured RS. In another example, in block 604, the WTRU performs random access with a target TRP, using pre-configured or pre-determined resources. The resources may be pre-configured or pre-determined from a previous indication from the source TRP or from the Target TRP.

In block 605, The WTRU receives a response with a grant of resources. Resources may be for UL transmission, DL transmission, or both, or may be for some other process or procedure. In block 606, the WTRU indicates its own identity, which may include its own context. In block 607, the Source TRP and the Target TRP perform Inter-TRP coordination. This coordination may be to determine which TRP will share which resources with the WTRU. In block 608, the WTRU successfully receives the transmission and updates the configuration of the serving TRP with information that may be related to the new resources granted to the WTRU by the Target TRP.

To enable a WTRU or the network to determine that a WTRU would be optimally served by a specific TRP or set of TRPs, the WTRU may need to make measurements, and may need to make those measurements repeatedly, as the optimal TRP may change based on changes in conditions including mobility. Such measurements may include at least one of the measurement types discussed below.

For example, a WTRU may measure received power on a set of resources. The set of resources may be semi-static, or may be dynamically indicated. Each serving TRP may have independent sets of resources on which a WTRU may measure received power. A set of TRPs, e.g. a TRP group (TRPG), may also share at some resources on which a WTRU may make or maintain measurements.

A WTRU may measure the total received power over one or more symbols, covering a pre-determined or configurable bandwidth. A WTRU may determine the quality of a signal from a serving cell. One method to determine received quality may be to divide the received power by the signal strength.

A WTRU may also make measurements, possibly on a set of configurable resources, to determine a level of interference it experiences when served by a specific TRP on a specific set of resources. A WTRU may measure one type of interference or may measure more than one type. A WTRU may measure interference on a signal from a TRP, interference on a signal from any TRP within a TRPG, and/or interference on a signal from all TRPs within a TRPG.

A WTRU may determine the Signal to Interference plus Noise Ratio (SINR) when served by at least one TRP. A WTRU may also make measurements to determine channel occupancy. For example, a WTRU may have an ability to access an unlicensed channel.

TRP Load may be measured. The TRP load may be measured using a DL channel usage, an UL channel usage, or both.

To make measurements on one or more serving TRPs, a WTRU may first determine a resource on which it may make the measurement. For example, a WTRU may autonomously find a signal transmitted by the TRP that enables the WTRU to make measurements fulfilling appropriate requirements. A WTRU may also be notified of the resources on which to make measurements. This notification may occur dynamically.

A WTRU may determine the presence of a signature sequence autonomously and/or based on pre-determined rules. For example, a WTRU may blindly detect a first instance of a signature sequence and may determine the presence of further signature sequences for the TRP based on a pre-determined function. The pre-determined function may be fixed separation in time and/or frequency from the first detected signature sequence, but other pre-determined functions may be used additionally or instead of those recited. A WTRU may also be notified, possibly by the TRP, of the presence of a signature sequence, or a function to determine the presence of a signature sequence.

A mobility measurement may be performed by the WTRU on the signature sequence itself. For example, the WTRU may determine a received power of the signature sequence, and/or any interference present when decoding the sequence.

A WTRU may also perform measurements on a reference signal present for measurements. A signature sequence may point the WTRU to resources where it may expect a reference signal (RS) to be present for measurement purposes, which may occur implicitly or explicitly.

A WTRU may use a function to determine resources on which the RS is transmitted. This would be one example of implicitly pointing the WTRU to resources where it may expect a RS. The function may use a parameter of the signature sequence to determine a parameter of the RS. The parameter of the signature sequence that may indicate the resources used for RS may include at least one of: resource mapping; timing of the sequence; the sequence used; and/or antenna ports.

Resources used for transmission of the signature sequence (e.g. the combination of symbols and subcarriers) may indicate the relevant parameters of the RS.

Timing of the sequence may indicate a set of parameters of the RS, which may include timing of the RS. A WTRU may expect the RS to be in specific symbols or subframes, and it may determine the symbol or subframe numbering based on the timing of the signature sequence. The WTRU may also expect a specific timing offset between the signature sequence and the transmission of the RS.

A signature sequence may be transmitted using one of many possible sequences. The sequence of the signature sequence may map to specific parameters for the RS.

Antenna ports used to transmit the signature sequence may indicate a set of parameters of the RS. For example, a beam may be used to transmit a signature sequence and the same beam may be used to transmit the RS. These are examples of implicit indication. Other manners of implicit indication may be used.

A signature sequence may encode parameters of the RS. This is one example of an explicit indication of the RS by the signature sequence. For example, the signature sequence may be detected and demodulated by the WTRU and the information may indicate some parameters of the associated RS. The signature sequence may also map to an entry in an access table. The entry may indicate some parameters of the associated RS. These are examples of explicit indication. Other manners of explicit indication may be used.

A WTRU may also perform mobility measurements by using a UE-dedicated RS. The UE-dedicated RS may be configured by the one or more serving TRP. The UE-dedicated RS may also be transmitted, which may occur periodically or aperiodically. Aperiodic transmission may be indicated by one or more serving TRPs. For example, aperiodic transmission of RS may be multicast to an appropriate group of WTRUs sharing similar RS configuration.

Furthermore, the UE-dedicated RS may also be transmitted only inside or outside a transmission burst. A transmission burst may be defined as a period of time for which a serving TRP has DL transmission to, or expects an UL transmission from, any of its WTRUs. For the sake of UE-dedicated RS transmission, a transmission burst may also be a period of time for which a serving TRP has DL transmission to or expects an UL transmission from the WTRU itself.

The UE-dedicated RS may be transmitted upon request from the WTRU. The method by which a WTRU may request the transmission of UE-dedicated RS may be indicated in the access table, or may be configured by one or more serving TRP.

The UE-dedicated RS may be transmitted as a result of transmission of a channel or the contents of another transmission. For example, a WTRU may feedback certain measurements performed on a first RS. Depending on the value fed back, the WTRU may expect the transmission of a second RS on which it may perform mobility measurements. A WTRU may also report NACK for a DL transmission. The WTRU may also expect the transmission of an RS to perform mobility measurements. This may be based on a redundancy version of the transmission that caused the NACK.

The WTRU may also be configured to perform periodic mobility measurements. The WTRU may also be configured to perform mobility measurements when appropriate RS is present. This may be for either on-demand RS transmission or TRP selected RS transmission.

A WTRU may be required or expected to make measurements whenever it has UL data to transmit to at least one TRP, or whenever it expects DL transmissions from at least one TRP. For example, a self-contained subframe may be used, composed of a control region, a DL transmission region, an UL transmission region and appropriate guard periods. If the WTRU is scheduled for either DL transmission or UL transmission, or both, during such a subframe, the WTRU may perform mobility measurements, possibly on an RS in the same subframe.

A WTRU may be triggered to perform a mobility measurement on a serving TRP by at least another TRP. A measurement being triggered on another serving TRP sharing the same signature sequence may cause such a trigger. A measurement being triggered on at least one other serving TRP using a different signature sequence may also trigger a mobility measurement event at the WTRU. Detection of another TRP, sharing or not sharing the same signature sequence, may also cause a mobility measurement. Increased interference from another TRP sharing (or not sharing) the same signature sequence, may also trigger a mobility measurement.

A WTRU may be triggered to perform a mobility measurement based on WTRU location, speed or heading. For example, a WTRU may also be triggered to perform a mobility measurement on a serving TRP based on the WTRUs location, speed, heading. A WTRU may transition from a non-moving state to a moving state, which may trigger a mobility measurement. The WTRU may also move from one predetermined area to a different pre-determined area, which may also trigger a mobility measurement. Predetermined areas may be determined by the WTRU, or may be signaled by the network, and may be defined by exact geographic coordinates (latitude, longitude, or the such) or may be relative to specific reference physical locations or distance from such locations, of which the WTRU is also aware. The WTRU, in such cases, may determine its own location, speed, heading, etc. independently using location technology such as GPS, or by using network based methods and having the location signaled to it by the network.

A WTRU may be configured with a list of areas from which it may determine if mobility measurements are required. A WTRU may also autonomously determine such a list of areas. The list may include geographic locations. Lists may also include sets of TRPs, and may include configurations to enable mobility measurements of the TRPs. The sets of TRPs per geographic list may be maintained by the WTRU. For example, a WTRU may add a TRP to a list upon making a relevant measurement. A WTRU may also remove a TRP from a list upon expiration of a timer. The timer may be started at the moment of a most recent mobility measurement on a TRP.

A WTRU may also determine a trigger for a mobility measurement based on its distance from a specific TRP. A WTRU may receive the geographical location of one or more TRPs. The WTRU may receive this information from broadcast or dedicated signaling from the TRP or through information from the access table. If there is a change in distance, or if a distance meets a specific triggering criteria, a mobility measurement may be triggered. For example, the WTRU may trigger a mobility measurement if the distance between the WTRU location and the signaled TRP location exceeds a threshold.

A WTRU may report a measurement whenever it has completed one. The WTRU may also have periodic resources on which it may report mobility measurements. Such resources may be similar to CSI feedback resources. The WTRU may be triggered to report measurements aperiodically by a serving TRP. Such a trigger may include an UL grant of resources, on which the WTRU may report one or more measurements.

A WTRU may be triggered to report measurements. When a measurement is triggered, the WTRU may feedback such measurement. Whenever a measurement has been, or may be, performed upon detection of a new signature, the WTRU may be triggered to report measurements. The WTRU may also be triggered to report measurements when a measurement has been, or may be, performed upon detection of a new RS for the same signature.

The WTRU may also be triggered to report measurements based on thresholds, which may be absolute or relative to other measurements. The comparison between a measurement and a threshold may depend on whether the measurements are for TRPs sharing signature sequences. A WTRU may also be triggered to report measurements when the WTRU is provided with resources to report measurements, or based on a change of location, speed, heading, or distance from one or more TRP, as determined by the WTRU.

Measurements may be reported via different mechanisms. For example, measurements may be reported on physical channels used for UL transmissions. Mobility measurements may be included in periodic feedback or aperiodic feedback. Mobility measurements may also be included in UCI transmitted within an UL grant for data transmission. A WTRU may also report mobility measurements on physical layer resources. A WTRU may also report mobility measurements on a MAC CE.

A WTRU may reuse CSI feedback resources. In reusing CSI feedback resources, the WTRU may include an identifier to indicate the CSI feedback report has been supplanted by a mobility measurement report. The identifier may also indicate that mobility measurements have been concatenated or put into the CSI feedback report.

The WTRU may report mobility measurements in HARQ feedback. The presence of mobility measurements may depend on the feedback itself. For example, an ACK may indicate to the serving TRP that no mobility measurements are included, which may occur because a channel is good enough to support the transmission. A NACK, possibly on a specific retransmission, may also indicate to the serving TRP that a mobility measurement is also included.

A WTRU may report mobility measurements in the UL portion of a self-contained subframe. For example, a WTRU configured with RS for mobility measurements, or configured to make mobility measurements on a self-contained subframe, may transmit the mobility measurement in the UL portion of the subframe. When a measurement triggers a mobility measurement or a mobility measurement report in a self-contained subframe, the report may also be transmitted in the UL portion of that same subframe.

A WTRU may maintain measurements of neighbor TRPs for later use. A TRP may be identified by a WTRU by a transmitted signal, a signature sequence, or assistance from another TRP.

For example, a reference signal transmitted by the TRP may also be used by the WTRU to synchronize to the TRP. The transmitted signal may also be transmitted by a TRP other than the TRP to be identified. The transmitted signal may also be transmitted by another WTRU, possibly one served by the TRP. The transmitted signal may be periodic, or may be on-demand by the WTRU.

A signal may be transmitted periodically with at least some parameters identifying at least one TRP. The signature sequence may map to an entry in an access table transmitted less often. The access table may provide some TRP system information.

For example, a first TRP may be identified by assistance information transmitted from a second TRP. Although a WTRU has identified the presence of a TRP, it does not necessarily follow that a WTRU has performed any measurements.

A WTRU may detect and synchronize to a TRP that is not currently serving the WTRU, which may be referred to as a neighboring TRP. Upon detecting a neighboring TRP, the WTRU may classify the TRP based on whether it shares a signature sequence with at least one serving TRP. If a signature sequence is shared, the access table may provide a list of RSs on which to synchronize to different TRPs within the TRPG sharing signature sequence. The WTRU may also assume some synchronization is shared between TRPs that share a signature sequence. For example, the WTRU may use synchronization to a serving cell as coarse synchronization to a neighboring cell sharing signature sequence. The access table may also provide the resources where RS are located to perform measurements.

If the signature sequence of a neighboring TRP is not shared by at least one serving TRP, the WTRU may not assume any shared synchronization with a serving TRP. In such a case, the WTRU may require multiple transmissions of the signature sequence before assuming adequate synchronization to perform mobility measurements.

The search for neighbor TRPs with signature sequences not shared by at least one serving TRP, may be configurable and may be assisted by a serving TRP. For example, a WTRU may receive a signature sequence identity or a set of resources where it may look for a new signature sequence, from at least one of its serving TRPs. A WTRU may also be instructed by at least one of its TRPs to search for other signature sequences without further assistance. A WTRU may also autonomously search and detect neighboring TRPs using other signature sequences.

Neighbor TRP measurements may use any of the methods and measurement types proposed herein for serving TRP measurements.

If a signature sequence is used by at least one serving TRP, the WTRU may be expected to perform measurements on all TRPs using the signature sequence. If a signature sequence is not used by at least one serving TRP, the WTRU may be configured to measure a neighbor TRP upon detection of the signature sequence or TRP. In this case, the WTRU may be expected to measure one, some, or all TRPs sharing the newly discovered signature sequence.

If a measurement on at least one serving TRPs achieves a threshold, a WTRU may be triggered to perform a measurement on a neighbor TRP. For example, received power on at least one serving TRP may fall below, or go above, a threshold. Received power is just one example of a measurement that may be use to trigger a measurement.

If a WTRU is unable to properly decode a number of transport blocks using less than a number of retransmissions, this kind of change in demodulation performance by the WTRU may trigger a measurement. The number of transport blocks, and/or the amount of retransmissions, may be configurable.

A measurement triggered on a serving TRP may trigger a measurement on a one or more neighbor TRPs. This may be applicable if the neighbor TRPs share a signature sequence with the serving TRP for whom a measurement has been triggered.

A change in the WTRUs location, speed, heading, or distance between the WTRU and the neighbor TRP may also trigger a measurement. This may also be combined with a requirement that the TRP shares the same signature sequence.

A WTRU may determine measurement resources from an access table. If the signature sequence of a neighboring TRP is the same as at least one serving TRP, the WTRU may receive assistance from the serving TRP. The WTRU may also obtain resources from at least one serving TRP, and it may use those resources to demand measuring resources from the neighboring TRP. For example, the WTRU may be provided resources by a serving TRP for an UL transmission to a non-serving, TRP. The UL transmission may be to trigger the neighboring TRP to transmit possibly UE-dedicated RSs for measurements.

If the neighboring cell does not share a signature sequence with at least one serving TRP, the WTRU may be required to trigger RSs for measurements by using shared UL resources. For example, the WTRU may transmit a probing signal. Such a probing signal may be transmitted on resources specific to a signature sequence. The probing signal may also indicate the signature sequence for which it is being transmitted. The probing signal may also trigger the transmission of the required RSs, or it may trigger the transmission of, possibly UE-dedicated, system information. System information may be included in a triggered access table transmission.

Neighbor TRP measurements may be reported in a similar manner to the methods defined herein for reporting measurements from serving TRPs. Neighbor TRP measurements may also be reported whenever a serving TRP measurement is reported. A subset of neighbor TRP measurements may also be reported. For example, the WTRU may rank the neighbor TRPs based on their measurements and only report the best. The WTRU may report measurements for all TRPs sharing the same signature sequence as the best TRP. The WTRU may report a measurement for a single TRP per signature sequence. The WTRU may report the measurements for a set of the best TRPs, independent of whether they share signature sequence or not.

A neighbor TRP measurement report may be sent to different destinations. A WTRU may report a neighbor TRP measurement to at least one of its serving TRPs. For example, the WTRU may report neighbor TRP measurements to any serving TRP sharing the signature sequence of the neighbor. The WTRU may also report neighbor TRP measurements to a primary serving TRP, regardless of whether the neighbor TRP and primary serving TRP share a signature sequence.

The WTRU may also report measurements to the TRP for whom the measurement applies. This may enable WTRU-autonomous handover.

A WTRU may also report measurements to any TRP that is capable of hearing the WTRU. For example, a WTRU may be configured with resources on which it may report measurement feedback. Such resources may be shared among TRPs, such as among TRPs sharing a signature sequence. The WTRU may also be provided shared resources on which to report measurements. The shared measurement resources may be shared per TRPG, for example, sharing same signature sequence.

Beyond simply reporting back a measurement, a WTRU may be triggered to perform other, actions upon obtaining a measurement. Actions to be performed may be configurable. A WTRU may be triggered to perform random access to that neighbor TRP based on a measurement of at least one neighbor TRP, satisfying at least one criterion such as a measurement threshold. Such an RA may be modified to include a cause value to the neighbor TRP. The cause value may indicate the measurement or the value of the measurement that triggered the RA. The cause value may also indicate at least one source TRP. For example, a criterion for such an action may be if a neighbor TRP measurement is offset greater than the measurement of at least one serving TRP. In such a case, the RA cause value may indicate the serving TRP whose measurements are offset lower than that of the neighbor TRP. Such a measurement-triggered RA may only be possible if the neighbor TRP shares a signature sequence with at least one serving TRP. A measurement-triggered RA may include some WTRU information to enable appropriate handover between at least one source TRP and the target TRP.

A WTRU may build and maintain a list of neighbor TRPs, which it may provide to the network. Such a list may comprise the neighbor TRPs that are currently being measured by the WTRU. It may also comprise the list of TRPs for which the TRP measurements have met some specific criteria. Such criteria may be based on any of the measurements described herein. The list may also comprise the neighbor TRPs which the WTRU is able to detect. The list may also comprise the TRPs that belong to one or a set of specific system signatures. The neighbor TRP list may also comprise the list of TRPs for which the conditions for the WTRU to perform a WTRU-autonomous handover are satisfied.

A WTRU may transmit the neighbor TRP list to one or more of its serving TRPs. One reason for sending the neighbor TRP list may be to allow a TRP or the network to determine, in the case that a WTRU context needs to be transferred directly from one TRP to another, which TRPs needs to be involved in this context transfer. Another motivation may be to allow the network to choose TRPs to which a WTRU's DL traffic from the network needs to be sent, and to choose which TRPs need to coordinate resources. A WTRU's data may be provided to multiple TRPs for DL transmission. The actual TRP or TRPs transmitting the data may be triggered by the WTRU, which may involve the use of an autonomous handover operation.

As a WTRU moves, it may update and report a new version of the neighbor list to the network. Updates may include adding or removing neighbor TRPs from the list, and updates to the list may be triggered by certain factors or circumstances. A WTRU may update based on one or more triggers. If measurements associated with a TRP meets or fails to meet one or more specific criteria, that may trigger adding or removing a neighbor TRP from the list. A neighbor TRP may also be added to or removed from the list if a distance between the WTRU and a specific TRP is above/below a specific threshold, or if speed of a WTRU increases/decreases beyond a specific value. For example, the WTRU may be configured with a specific minimum number of TRPs in the measurement list when its speed is above a certain amount, or a WTRU may be configured with a desired measurement list size corresponding to each speed range. A neighbor TRP may also be added to or removed from the list if a new signature sequence is detected. In this case one or more TRPs associated to the new signature sequence may be added). A neighbor TRP may also be added to or removed from the list if a TRP from a TRPG is added to the neighbor list, in which case all other TRPs in the TRPG may also be added.

The WTRU may send the neighbor list to the network as triggered by a number of situations. The WTRU may be configured to periodically transmit the neighbor list. The WTRU may also be triggered by at least one TRP, perhaps a serving TRP, to transmit the neighbor list. The WTRU may also transmit the neighbor list upon a change to the list, such as addition or removal of a neighbor on the list. The WTRU may also transmit the neighbor list upon a random access or WTRU-autonomous handover, as described below.

Figure 7:
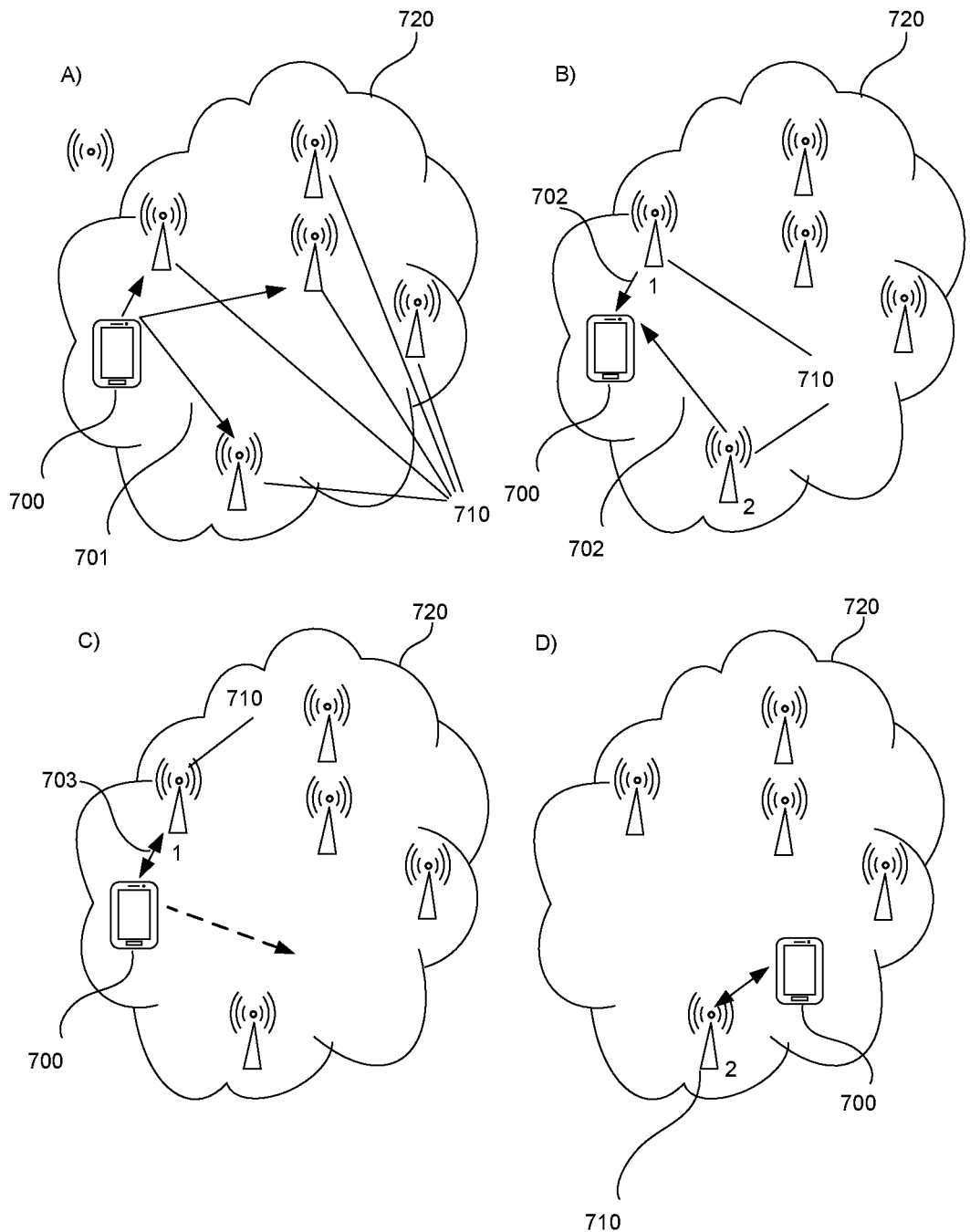
FIG. 7A through FIG. 7D are diagrams of an architecture of TRP mobility in different steps in a mobility process.

An architecture diagram for Random Access (RA) is shown in FIG. 7. A WTRU 700 may begin by transmitting an RA preamble via random access transmissions 701, which may be detectable by multiple TRPs 710, up to and including all TRPs 710, in TRPG 320. The WTRU 700 may then receive a RAR 702 from one TRP 710 and another RAR 702 from a second TRP 710, in response to random access transmissions 701. The WTRU 700 may begin data transmission 703 with the first TRP 710 based on the RAR information received from the first TRP 710, and may also store the RAR 702 from the second TRP 710. When the WTRU changes location in a mobility direction, or when the first TRP becomes non-responsive or the communication becomes slow below a threshold, the WTRU 700 may cease transmitting between itself and the first TRP 710 and may, without another initial exchange of RA information, begin transmitting to the second TRP 710 instead, based on the new location of the WTRU and its relative proximity to the first TRP 710 and the second TRP 710. This may occur within a single cell of operation. The ability to seamlessly switch between TRPs because of stored RAR data allows greater mobility and reduces mobility related signaling and a number of always-on signals.

A WTRU may be triggered to perform RA to a neighboring TRP by a measurement or combination of measurements. For example, a WTRU may determine that a neighboring TRP may have become stronger (e.g. have higher received power) than a serving TRP. A measurement on a neighbor TRP may also indicate to the WTRU that the neighboring TRP may be added to the set of serving TRPs. This may depend on whether the neighbor TRP a shares signature sequence with at least one serving TRP.

A WTRU may perform RA to a neighbor TRP if the WTRU has determined that it has suffered a decrease in transmission performance from at least one serving TRP. Such a decrease in performance may be determined from an inability to decode one or more transport blocks (TB). For example, upon having at least a threshold number, x, TB undelivered with an allowed number of retransmissions, for example, by requiring RLC retransmissions, a WTRU may determine that it has suffered performance degradation. The x TB may be x consecutive TB, or, the x TB may be any x TB within a time period or total number of transmitted TBs. The time period or the total number of transmitted TBs may be configurable.

A WTRU may be indicated to perform RA on a neighboring TRP by at least one serving TRP. The indication may be WTRU-specific, group-specific or TRP-specific. The indication may be on a physical channel or may be broadcast. The indication may also be added to an access table entry. For example, a WTRU served by a TRP should continue monitoring the access table entry to which it is mapped by the serving TRP's signature sequence. The indication may be by a change of one or more parameters of the signature sequence.

A WTRU may determine that its current set of serving TRPs may not satisfy its UL or DL transmission needs. In an example, a WTRU may have URLLC transmissions that require macro diversity. In order to achieve the required macro diversity, the WTRU may need to increase its serving TRP set. As such a WTRU may perform RA to at least one neighboring TRP.

For example, a WTRU may determine that it has a change in transmission requirements. This may be manifested as a change in desired SOM. The WTRU may therefore perform RA to a neighboring TRP that can support the required SOM.

For example, a WTRU may determine that based on its speed it would be better served by a TRP with a larger or smaller coverage area. The WTRU may then perform RA to at least one appropriate TRP.

For example, a WTRU may have a list of possible TRPs per geographical area. Upon entering a geographic area, as determined by a location function, the WTRU may attempt RA on at least one TRP.

For example, a WTRU may have RLF to at least one serving TRP. In such a case, the WTRU may perform RA to at least one neighboring TRP, or to the serving TRP from which it suffered RLF.

The RA procedure may depend on whether the RA is to a TRP that shares signature sequence with at least one serving TRP or not. For example, for RA to perform handover to a target TRP sharing signature sequence with at least one source TRP, the WTRU may assume configured UL resources are still valid. The WTRU may immediately continue pre-scheduled UL transmissions upon reception of a RAR. The WTRU may also assume that configured DL transmissions (e.g. of reference signals, or semi-persistent scheduled transmissions) are also still valid.

On the other hand, for a RA to a TRP that does not share a signature sequence with at least one serving TRP, the WTRU may need to provide the TRP with more information before expecting new scheduling grants. This may include HARQ processing state, WTRU contexts, security information, etc. Such information may be shared upon reception of a grant from a RAR message. Such information may also be shared in an enhanced preamble transmission. Furthermore, any configured UL resources may be assumed no longer valid.

An RA preamble transmitted by a WTRU may be targeted for a specific target TRP, or any TRP within a TRPG, which may be comprised of TRPs sharing same signature sequence. Such an RA may use resources indicated by at least one source TRP. For example, the resources may be determined to be the same as those used for a source TRP, if the source TRP shares signature sequence with the target TRP.

The RA preamble may be transmitted without an intended target. This may be applicable to any TRP within a group of TRPs sharing a signature sequence or to any TRP even not sharing a signature sequence. Such an RA may be considered a probing type mechanism to enable any TRP capable of detecting the RA preamble to being transmitting at least one signal. For example, the RA preamble may enable all neighboring TRPs to transmit their signature sequence, or system information, or to transmit an RS to enable measurements.

A WTRU may receive a single random access response (RAR). For example, a set of TRPs may coordinate to transmit a single RAR. The RAR may include information on the set of TRPs. From the RAR, the WTRU may be able to determine one or more TRPs to connect to.

In another solution, a WTRU may receive multiple RARs, possibly one per TRP that successfully received the RA preamble—or possibly one RAR per TRPG. Optionally, a WTRU may receive one RAR per set of TRPs sharing a signature sequence.

Upon reception of multiple TRPs, the WTRU may select one or more based on measurements, a signature sequence of the TRP transmitting the RAR, WTRU context sharing, timing of reception of RAR, TRP capabilities; and/or a parameter indicated in the RAR.

A WTRU may select on or more based possibly on measurements made on RS prior to the transmission of RA preamble. Measurements may also be made on signals transmitted with the RAR.

A WTRU may give priority to TRPs sharing a signature sequence with at least one source or serving TRP. A WTRU may also give priority to a TRP not sharing a signature sequence with at least one source or serving TRP. This may enable the WTRU to be served by a new set of TRPs, possibly enabling more seamless mobility.

A WTRU may give priority to a TRP sharing WTRU context, or HARQ processing or scheduler with at least one source or serving TRP. A WTRU may also prioritize a TRP that transmitted its RAR earlier than another TRP. The WTRU may also interpret the timing of a RAR as a function of the latency achievable in transmissions to or from the TRP.

A RAR may include TRP capabilities, and a WTRU may prioritize TRPs whose capabilities better match the WTRU's requirements. TRP capabilities may also be known by the WTRU a priori to the transmission of the RAR, because, for example, the TRP capabilities may be included in an access table.

The WTRU may also select a RAR based on a parameter transmitted in the RAR. The parameter may include current TRP load, traffic, transmission limitations, UL and DL configuration, or other parameters. Transmission limitations may be used to reduce interferences between TRPs.

A WTRU may select more than one RAR representing more than one TRP. This may enable the WTRU to be configured for carrier aggregation, or dual connectivity or CoMP. The selection of the more than one RAR may depend on similar criteria as defined for the selection of a single RAR. In an example, the WTRU may select one RAR per group of TRPs; where a group of TRPs may define a set of TRPs sharing same signature sequence. The WTRU may also select all RARs from a TRPG (that is to say all RARs coming from TRPs sharing a signature sequence). The TRPG from which a WTRU may select all RARs may be determined as being one whose signature sequence is, or is not, shared with at least one source or serving TRPs.

A WTRU may select a subset of RARs to continue the full RA process with. However, the WTRU may also store the set TRPs (as well as any information included within the RARs) that transmitted unused RARs for possible future rapid random access. For the set of stored TRPs, the WTRU may transmit an acknowledgement of received RAR, but discontinued RA process. Furthermore, the WTRU may maintain measurements on such TRPs.

A RAR may include at least one of: a timing advance; a set of UL resources; system information; an indication of seamless mobility; and/or an indication of a need for WTRU information. Resources for an UL transmission, or resources for scheduling request may be included in a RAR.

System information may be transmitted on-demand and/or on WTRU-dedicated resources. The RAR may include system information. The RAR may also include resources on which a WTRU may demand system information, which may include updated system information.

In the case of an indication of seamless mobility, a WTRU may assume that upon reception of a RAR, all of its context and configurations from a source TRP are maintained. For example, a target TRP may not be able to obtain WTRU contexts, HARQ processing state, scheduling information, or WTRU configurations from at least one source or serving TRP. The target TRP may also not share a signature with at least one source TRP and such WTRU information may only be shared dynamically by TRPs sharing signature sequence. The RAR may indicate to the WTRU that it needs such information to be able to perform PHY layer mobility. The RAR may provide the WTRU with UL resources to transmit such information.

The RAR may also provide a set of UL resources to continue transmitting a grant provided by a source TRP. The RAR may also provide a translation function, and/or translation rules, to allow the WTRU to translate between resources granted by a source TRP to the corresponding resources that should be used in the target TRP in case the transmission occurs in the target.

The location of certain channels and signals from the source TRP to the target TRP may be indicated. These signals may include PUCCH, SR, or SRS, A translation function and/or translation rules, to allow the WTRU to translate the location or nature (time, frequency, scrambling code) of the channels or signals, may also be indicated.

An indication about whether a resource granted in the source TRP is also available in the target TRP may also be provided.

A WTRU may obtain required information from at least one source or serving TRP and perform a transmission to a target TRP. The WTRU may also indicate to at least one source or serving TRP to provide the required information, or a subset thereof, to the target TRP. Such an indication may include a target TRP identifier. Such an indication may also provide radio resources on which the one or more source or serving TRPs may transmit the required WTRU information.

A RAR may also indicate to the WTRU an inability to perform PHY layer mobility, and may also indicate that it has begun higher-layer mobility procedures to obtain the appropriate WTRU information.

If a WTRU does not receive a RAR from a target TRP, it may indicate to a serving TRP, e.g. a source TRP, that it has attempted RA to a neighbor TRP and failed to receive a RAR. Such an indication may include a target TRP identifier, which may be a signature sequence. Such an indication may also provide a reason why the WTRU is attempting the RA to the target TRP. The reason may include a desire to perform handover, a desire to add a serving TRP to an existing set, a desire to connect to a target TRP for one-shot transmission, or a desire to receive system information from target TRP. Other reasons may also be included.

In the case of a desire to perform handover, a WTRU may also indicate the set of TRPs that it wished to drop upon completing the handover to the target TRP(s).

A serving TRP may be added to an existing set, which may be used for carrier aggregation, dual connectivity or CoMP.

A WTRU may request connect to a target TRP for a one-shot transmission, which may be used when, the WTRU wishes to connect to a target TRP to indicate its presence, or that it suffers detrimental interference from the target TRP.

Failing to receive a RAR from a target TRP may also be a trigger for a WTRU to report mobility measurements to at least one serving TRP. Radio Link Failure (RLF) may be determined and declared by the WTRU for one, some or all serving TRPs. For example, RLF may be determined on an individual TRP basis, regardless of whether its signature sequence is shared. RLF may also be determined and declared on a TRPG if one, some or all serving TRPs within that TRPG suffer RLF.

A WTRU may experience RLF if it fails to find an adequate target TRP and at least one measurement on at least one serving TRP is lower than a threshold. For example, a WTRU with a single serving TRP may find that received power has decreased below a threshold, possibly for a certain period of time, for a set of consecutive measurements, or for a set number of measurements within a time period. Decreased power may trigger the WTRU to attempt to find a target TRP. If the WTRU does not find an acceptable TRP within a set period of time, it may declare RLF. The declaration of RLF may depend on whether the WTRU is capable of finding a target TRP using the same signature sequence as at least one serving TRP, or a target TRP using a different signature sequence as all serving TRPs. For example, a WTRU may have the ability to declare RLF on a TRPG basis, where the TRPs in the TRPG share the same signature sequence. In this example, a WTRU may find a target TRP that does not share signature sequence with any serving TRP, and may even perform RA to that target TRP. However, the WTRU may declare RLF on any TRPG for which it did not find a new adequate target TRP.

A WTRU may also declare RLF if at least one measurement on at least one serving TRPs is lower than a threshold and it fails to receive a RAR after attempting RA on at least one target TRP.

A WTRU may also declare RLF if at least one measurement on at least one serving TRP is lower than a threshold, and it fails to complete RA (e.g. fails to receive RAR) to that at least one serving TRP. A WTRU may also declare RLF on a serving TRP if it is incapable of decoding a transport block on a final HARQ retransmission. In another solution, a WTRU may declare RLF on a serving TRP if it has reached maximum RLC transmissions for a transport block. A WTRU may also declare RLF if it has exceeded performance criteria of a radio bearer and/or SOM. For example, a WTRU may declare RLF if it is incapable of achieving a certain required delay for a SOM. In this example, the cause of RLF may be indicated upon declaration of RLF. This may enable the network to determine that a TRP or TRPG are still able to provide certain connectivity to a WTRU, just not the one required for that SOM.

A WTRU may also declare RLF if a measurement shows that it may not be able to achieve the required average performance. For example, a first measurement, which may be a received power measurement, may indicate that a WTRU is capable of achieving certain instantaneous performance. However, a second measurement, which may be a number of diversity branches, may indicate that on average the WTRU will not achieve the required performance.

A WTRU may also declare RLF if it is incapable of being configured with, or detecting, required reference signals. For example, a WTRU may be indicated WTRU-specific and possibly dynamic reference signals. Upon expiration of a first set of reference signals, if the WTRU is not configured with a new set, or is incapable of detecting the new set, it may declare RLF.

RLF may be determined and declared per direction of transmission. For example, a WTRU may determine that it is no longer capable of achieving a required level of performance for UL transmissions to a serving TRP. However, the same WTRU may be capable of DL transmissions from the same set of TRPs. Or, the reverse may be true. In this case, a WTRU may declare RLF with an indication of the type of transmissions for which it is declaring RLF, either UL or DL.

In another solution, a WTRU may transmit an UL signal, enabling measurements done by at least one serving TRP. The UL signal may be periodically transmitted by the WTRU. The UL signal may also be transmitted upon being triggered by the WTRU. A trigger may include any of the aforementioned causes for detection of a neighbor TRP, RA to a neighbor TRP, or declaration of RLF. The UL signal's transmission parameters may be semi-static (e.g. indicated in an access table or in system information) or may be configured and WTRU-specific. Upon transmission of an UL signal, the WTRU may start a timer. Upon expiration of the timer, if the WTRU does not receive a response from the TRP to which the signal was targeted, the WTRU may declare RLF to the serving TRP.

RLF declaration may depend on the type (e.g. SOM, or URLCC/eMBB/massive MTC) of transmissions for which the serving TRP was used. For example, different thresholds may exist for different types or modes of transmission. Furthermore, an RLF may be applicable only to one type or mode of transmission. In this example, a WTRU may declare RLF to a TRP for URLLC but may still be capable of eMBB.

A WTRU may be configured with two different thresholds, where the first threshold is higher than the second threshold. The first threshold may be a pre-RLF threshold and the second threshold may be a RLF threshold. WTRU may perform a first set of actions if the measurements of system signature and/or reference signal goes below first threshold and a second set of actions when the measurements of system signature and/or reference signal goes below the second threshold. For example, when one or more serving TRPs goes below first threshold, WTRU may perform one or more of the actions described below.

A WTRU may transmit the request for measurement reference signals towards non-serving TRPs within a TRPG. For example, such measurement reference signals may be WTRU specific or TRP specific reference signals that are turned off for power saving. A WTRU may also transmit UL measurement signals on preconfigured WTRU-specific resources. One or more TRPs may listen on those UL resources and measure WTRU's transmissions.

The WTRU may also be configured to receive downlink control information according to different transmission methods. Different transmission methods for downlink control information may imply different levels of reliability. Different levels of reliability may be realized by the WTRU being configured with more than one control channel, control channel search spaces, aggregation levels for decoding of the DCI, sets of control channel elements, or the likes. For example, the WTRU may monitor only a first control channel. The WTRU may also monitor a control channel search space when the serving TRP is above the first threshold. When the serving TRP is below the first threshold, WTRU may start monitoring a second set of control channels or control channel search space. The first set of control channels may be TRP specific and a second set of control channels may be common to more than one TRP or all TRPs within the serving TRPG. A non-serving TRP may also transmit a handover command on the second set of control channel (or) control channel search space based on a WTRU measurement report or UL measurement signals.

A WTRU may also trigger initial access procedures (e.g. random access) towards non-serving TRPs within the TRPG. A WTRU may include additional information regarding the serving TRP ID, radio bearer configuration, WTRU context, reason for failure etc to those TRPs. In another option, a WTRU may perform RA-less autonomous HO procedure described below.

When one or more serving TRPs goes below the second threshold, a WTRU may declare RLF and perform the above mentioned actions towards TRPs in other TRPGs, TRPs in other layers, or LTE-Evo eNB.

If a WTRU is served by multiple TRPs, the WTRU may send a declaration of RLF to one of its other serving TRPs. For example, the WTRU may send a declaration of RLF to any other serving TRP sharing a signature sequence with the TRP for which it experiences RLF.

If a WTRU is served by a single TRP (or a single TRP for a signature sequence), the WTRU may begin re-establishment procedures. If a WTRU is served by a single TRP, or a single TRP for a signature sequence, the WTRU may also begin to search for another TRP sharing the signature sequence. If an adequate target TRP is discovered, the WTRU may begin RA, possibly indicating as cause, "RLF to another TRP sharing signature sequence." A WTRU may also attempt RA to any other adequate TRP, whether it shares signature sequence with the TRP experiencing RLF or not.

A WTRU may also attempt quick RA to a TRP for which it had stored a previously transmitted successful RAR, but for which it had not continued with the RA procedure. In such a case, the WTRU may indicate to such a target TRP that it saved parameters transmitted in a previous RAR and that it wishes to continue with this interrupted RA procedure. To enable this, it is possible that the RAR includes UL resources on which a WTRU may continue with such interrupted RA procedure. There may also be an associated timer indicating the time for which such resources are valid.

WTRU behavior upon experiencing RLF may depend on what the use case for the connection. For example, a type or mode of transmission (e.g. SOM, or URLLC/eMBB/massive MTC) may dictate to the WTRU the behavior it may take upon declaration of RLF. Accordingly, a WTRU may experience RLF for one mode (e.g. URLLC), but may be able to indicate to the TRP, possibly using another mode, that it experienced RLF for the first mode.

A WTRU may perform RA-less mobility, which may also be referred to as WTRU-autonomous HO. Triggers to perform such mobility may be similar to aforementioned triggers for detection of neighbor cells, triggers for measurements, triggers for measurement reporting or triggers for RA-based mobility. Furthermore, a declaration of RLF may initiate RA-less mobility.

The ability to perform RA-less mobility may depend on whether a target TRP shares a signature sequence with at least one source TRP. The ability to perform RA-less mobility may also depend on whether a target TRP has been provided a WTRU's DL data from the network to prepare for seamless handover.

A TRPG may have some common resources on which a WTRU served by at least one TRP within the TRPG may use for UL transmission, possibly to any TRP within the TRPG. Such resources may be WTRU-dedicated, or may be TRP- or TRPG-dedicated. The resources may be included in an access table or system information for the TRPG. The resources may also be provided by at least one serving TRP.

A WTRU may also receive an indication of whether a grant provided in the source TRP is valid in the target TRP. Such an indication may be provided in the initial grant. For example, the WTRU may receive with the grant a list of TRPs for which a grant is valid. It may also receive a translation rule or alternative resources to be used in a different TRP if the WTRU decides to transmit in the UL following movement to a different TRP. An indication of a valid grant may also be provided in the RAR, assuming the information about the pending grant was provided as part of the context transmitted in the RA message.

A valid grant may be indicated by resources in the target TRP which replace the resources in the source TRP. It may also be indicated by a translation rule, which may be a frequency offset, time offset, or difference in encoding, scrambling, or the like, which needs to be used to derive the target TRP resources from the initially granted source TRP resources. A valid grant may also be indicated by a change in access mechanism, protocol, or assumptions that need to be applied in the target TRP. A change may be, for example, new HARQ related parameters.

A WTRU may perform an UL transmission on such resources to indicate a request for WTRU-autonomous HO. Some UL transmission parameters may be reused from at least one serving TRP, possibly only for the same TRPG. For example, UL timing advance and power control may be reused by the WTRU. UL transmission parameters may also be indicated, possibly within the configuration of common UL resources.

A WTRU may indicate the request for WTRU-autonomous HO in one or more of the following ways. The request may be an UL transmission on the UL resources dedicated for a WTRU. Such resources may be common for one or more TRP within a TRPG. A WTRU may include preferred list of one or more TRP identities (for example based on measurements) in the UL transmission.

The request may be an UL transmission on the UL resources dedicated for a TRP. Such resources may be common for one or more WTRUs. A WTRU may perform contention based transmission on those resources. A WTRU may be configured with plurality of TRP specific UL resources. A WTRU may indicate the choice of target TRP by the selection of UL resources associated with the target TRP. A WTRU may include a form of unique UE ID to identify itself on the common resources.

The request may also be an UL transmission on the UL resources dedicated for a WTRU and TRP pair. WTRU may indicate the choice of target TRP and the UE ID by the selection of appropriate UL resources reserved for the WTRU and target TRP.

The UL resources mentioned above may also be reserved for any UL feedback transmission, including a CQI report, measurement report, scheduling request, possible WTRU-autonomous handover signaling etc). A WTRU may include type of report either in a MAC control element or may implicitly indicate the WTRU autonomous handover request by a choice a specific signal or preamble.

The UL resources mentioned above may also be reserved explicitly for WTRU-autonomous HO request. Any WTRU transmission on the UL resources may be considered a request for a WTRU-autonomous HO request.

In such an UL transmission, a WTRU may indicate its source TRP as well as desired target TRP. Such indications may be explicit, or may be implicit and depend on a parameter used for UL transmission. Parameters may include a sequence used for demodulation reference signal or an orthogonal UL transmission resource. Others may also be used.

A WTRU may transmit a form of UE ID to identify itself to the target TRP. A WTRU may use one or a combination of two or more of the following to indicate the UE identity, for example, a unique radio level identifier (e.g. RNTI) allocated in the source TRP and/or a unique UE context ID that identifies both the source TRP, the WTRU context within the source TRP, a set of radio bearer or logical connection ID that may be unique within a TRPG, and/or any transmission on the WTRU-specific UL resource may identify the WTRU implicitly. The WTRU may also include the characteristics of spectral operating mode and/or system signature used to serve the WTRU in the source TRP.

In such an UL transmission, a WTRU may indicate its source TRP as well as desired target TRP. Such indications may be explicit, or may be implicit and depend on a parameter used for UL transmission. Parameters may include a sequence used for demodulation reference signal, an orthogonal UL transmission resource, WTRU Buffer Status, or others.

A WTRU may provide an indication of WTRU-autonomous mobility to the source TRP, in addition to information related to the target TRP. Such information may be similar to that described for random access.

A WTRU may also provide WTRU information to the target TRP. Such information may include for example, UL resources granted, HARQ processing state, or WTRU contexts.

Such an UL transmission may also explicitly request reference signal resources from the target TRP to enable the WTRU to feedback measurements. Such measurements reports may enable the addition of a target TRP to a pre-existing set of serving TRPs, rather than simply replacing a source TRP with a target TRP.

A WTRU may restrict the autonomous HO procedure within the TRPG to which the serving TRP belongs. If a WTRU is served by more than one TRP, possibly part of two or more TRPGs, then WTRU may perform autonomous HO within the TRPs under all of those TRPGs. The TRPGs within which WTRU may perform autonomous HO may be called serving TRPGs. A WTRU may apply additional offset or bias towards TRPs within the serving TRPGs during the handover target TRP selection. A WTRU may perform L3 based handover if the target TRP belongs to a non-serving TRPG.

A WTRU may also trigger autonomous HO by default towards all the TRPs irrespective of the TRPG they belong. A WTRU may be required to verify the success of the autonomous HO based on the response from the network. For example, network may indicate the need to perform L3 based handover e.g. via a handover command message or L2 reset command, a WTRU may then reset the L2 context, flush HARQ buffers and transmit a L3 re-establishment message or handover complete message.

During or following the RACH procedure or WTRU-autonomous handover, a WTRU may send an indication to the source TRP that it has successfully connected to the target TRP. Such an indication may be used, for example, to terminate data transmission and/or expected reception over the resources of the source TRP. Specifically, in the case of the RACH procedure, the WTRU may continue to receive/transmit data with the source TRP following the transmission of the RA. The WTRU may then send an indication to the source TRP of successful connection to the target TRP, following which, it is assumed that data reception/transmission with the source TRP can be stopped.

The WTRU may send the indication to a source TRP of a successful connection to a target TRP at an instance of time, or when at a condition has been met. An indication of a successful connection to a target TRP may be sent upon reception of an RAR from the target TRP. An indication may also be sent upon reception of UL resources or DL data obtained from the target TRP. An indication may also be sent upon successful transmission/retransmission of any HARQ processes which were ongoing at the time the RA was transmitted, or the time autonomous HO was decided. An indication may also be sent upon successful decoding and possible reassembly by L2 (MAC, RLC, or similar layer) of a specific PDU or packet associated with a sequence number for which transmissions were ongoing when the RA was sent, or another specific sequence number determined by the WTRU. An indication may also be sent upon the expiration of a timer which may be started at transmission of the RA, reception of the RAR, decision to perform autonomous HO, or any other event following the aforementioned. An indication may also be sent Upon indication from the target TRP which may come in a RAR or at some finite (e.g. fixed or configurable) time following the RAR. The indication to the source TRP may contain an identification and/or signature sequence of the target TRP. The indication may also contain a status of untransmitted or unreceived PDUs at a specific L2 protocol layer. The indication may also contain the latest TRP list maintained by the WTRU, or measurements of the target TRP.

WTRU context transfer is described herein. When performing mobility/handover, the WTRU context may be transferred to the new TRP. While in legacy systems this task was carried out by the network, in 5G systems this may no longer be the case. In such cases, the WTRU may be configured to transfer a portion of its context to a new TRP. This may be motivated, for example, by a need to expedite handover when the traffic requires it. Another motivation would be to reduce unnecessary backhaul load. It may also lead to reduced number of transmissions and retransmissions as the WTRU HARQ information may be transferred directly.

The WTRU may thus be configured to transmit information to the new TRP when performing mobility/handover, in any order or combination. The WTRU may transmit HARQ Related context. It may also transmit PDU History Information. The WTRU may also transmit Buffer Information. The WTRU may also transmit security information. It may also transmit Radio Bearer/Logical Channel information and/or Source TRP information.

The WTRU may transfer the receiving-side and/or transmit side HARQ context. This information may include, for each HARQ process configured, HARQ Process number/ID. The information may also include HARQ process status, wherein such statuses include terminated, on-going, number of transmissions received/transmitted, new data, etc. The information may also include MCS/TBS or other control information of the packet being received/transmitted on the HARQ process. The information may also include last feedback information transmitted/received, and/or timing information: including SFN for the last transmission of that HARQ process.

This information may be used by the new TRP, for example, to determine the exact state to continue transmission. More specifically, the new TRP may determine the HARQ process status and continue transmitting where the source TRP left, provided the source TRP sends the HARQ context to the new TRP as well. The WTRU context information may be used to ensure that the new TRP is well in-sync to the source TRP.

The WTRU may transfer information regarding a history of successfully received PDUs. Depending on the architecture, the PDUs may be RLC PDUs, PDCP PDUs or even MAC PDUs, or PDUs of a layer which carries a PDU count or number. For example, the WTRU may transfer information related to the last successfully received PDCP PDU, or to the last NPDCP successfully received PDCP PDUs. This information may contain, for example, the sequence number of the associated PDUs and additional information related to the bearer or associated logical channel, for example.

This transfer of information relating to PDU history is designed to ensure that the new TRP does not transfer PDUs that have been received successfully already, which would waste resources, and ensures that no PDUs are dropped.

In order to expedite the start of the communication, the WTRU may indicate to the new TRP its buffer status or information so that the new TRP may start scheduling the WTRU appropriately, or may reject the handover in case the new TRP does not have sufficient resources for the WTRU.

The WTRU may further indicate, e.g. for URLLC traffic, the remaining time for transmission of packet or packet segments. This remaining time may indicate, for example, how long the TRP has to schedule the WTRU for transmission before the latency requirement is violated.

In order for the WTRU to transmit and receive data securely to/from the new TRP, security information may need to be transferred. Transmitting security keys unprotected over the air may put the WTRU at risk of an attack. One option could be to use a special encryption key to actually cipher the security context and transfer the ciphered security context to the new TRP. The new TRP could use the special key to decipher the information. The special key could be, for instance, a public key preconfigured in the WTRU or some other type of encryption key.

The WTRU may be configured to transfer Radio Bearer/Logical Channel (RB/LCH) information to the TRP. This information may be used, for example, for the new TRP to determine the highest priority RB/LCH to schedule. This may be useful on the UL as the new TRP would not need to wait to receive the configuration from the network and could start scheduling the WTRU without delay. This is particularly important for delay-sensitive data streams e.g. for URLLC traffic.

The information transferred may include, for example, number of RB/LCH, for each RB/LCH, the associated ID, the QoS information such as latency requirement, bit rate, or reliability.

In order for a new TRP to fetch remaining WTRU context and to complete the handover procedure, it may be necessary for the new TRP to be indicated by the WTRU source TRP. This information may include, for example, the source TRP ID, its IP address or other identifying information.

In order for the new TRP to be aware of the current power-related information and state of the WTRU, the WTRU may need to transmit some of this information to the new TRP. This information may consist of, for example, the latest power headroom computed by the WTRU, the instantaneous power used for the last transmission or on a specific subframe or set of subframes, the TRP specific power (if one exists) for the source TRP, etc.

In order for the new TRP to be aware of the WTRUs currently configured power savings information in order that any WTRU-related state be maintained, the WTRU may transmit its current power savings state as part of the context. This may consist of the sleep cycle, periodicity, current DRX state, or any current values of the parameters maintained by the WTRU which may have been known by the source WTRU and now needs to be transferred to the new TRP.

A WTRU may provide some D2D-related configuration or information to the new TRP, such as potentially the resource configuration, usage, sensing related information, and the like to the new TRP. This information allows the WTRU to continue D2D related communication under the control of the new TRP without interruption.

During mobility with multiple TRPs, a WTRU may communicate with multiple TRPs, either simultaneously, in TDM/FDM fashion, or based on certain rules which could depend on the TRP capability, the type of information (control vs data), and the type of data or service (e.g. logical channel).

A WTRU may also receive scheduling information from multiple TRPs. The TRPs which may provide a single WTRU with scheduling that may further correspond to the TRP list sent by the WTRU to the network. For example, a WTRU may report the TRPs for which measurements meet certain criteria. In response to such a report, the WTRU may be expected to receive scheduling from any of the TRPs provided in the report.

A WTRU may also be required to receive scheduling from a set of TRPs for a finite period of time, and receive scheduling from a possibly different set of TRPs following this. For example, the WTRU may be required to monitor control channels where such scheduling may be present. For example, the set of TRPs which may provide scheduling information may change periodically, or upon transmission of a new TRP list by the WTRU. Upon successful reception of the TRP list by the network, which may be accomplished through acknowledgement received by the WTRU, the WTRU may assume that the list of TRPs which can provide the WTRU with scheduling may be changed to the transmitted and acknowledged TRP list. The network may also provide this list periodically, and the WTRU may accordingly change the TRPs on which it is expecting scheduling information from.

A WTRU may be allowed to transmit simultaneously to multiple TRPs without the need to send a RA or to perform a WTRU-autonomous mobility procedure described herein. Simultaneous transmission may occur using different antenna ports. The WTRU may also transmit in TDM, FDM, or CDM) fashion. These TRPs may coincide with the set of TRPs from which the WTRU receives scheduling.

These TRPs may also come from another, possibly independent, set of TRPs. These TRPs may also coincide with the set of TRPs which are being signaled to the network in the TRP list. For example, the WTRU may indicate to the network which TRPs it may transmit to in the uplink each time it sends the TRP list. A WTRU may also transmit two lists: a first list for the set of TRPs from which a WTRU desires to receive transmissions, and a second list for the set of TRPs to which a WTRU wishes to transmit. A WTRU may also receive two lists from at least one TRP: a first list indicating the set of TRPs the WTRU should monitor for possible scheduling information, and a second list indicating the set of TRPs to whom a WTRU may be expected (or allowed) to make UL transmissions to.

For a given transmission, a WTRU may select the TRP on which to transmit to, based on a capability or service supported by a TRP (e.g. the type of traffic supported). The TRP selection may also be based on available TTI or set of TTIs supported by the TRP. TRP selection may also be based on the TRP or a list of possible TRPs may be signaled to the WTRU for it to use (for example, as part of the UL grant). It may also be based on a current load of a specific TRP, which may be signaled by the network. TRP selection may also be based on an immediate or short term availability of UL resources in that TRP. For example, a WTRU may transmit SR on a specific TRP when the SR configured in that TRP occurs first following the arrival of data in the WTRU required for transmission. A TRP may also be selected based on transmit power restrictions, or the resources required (for example, specific TRPs may be applicable only for specific numbers of antenna ports, PRBs, symbols, etc.).

A WTRU may be scheduled with resources for UL transmission and the WTRU may select which TRP to transmit to. This selection may be made based on prior knowledge of the TRP capabilities, and the type of data which the WTRU wishes to transmit with the specific grant.

The WTRU may also be provided with the TRP for transmission in the UL as part of the grant, either explicitly by identification of the TRP, or implicitly by the specific TTI or resource set it signaled in the grant.

A WTRU may indicate to the network the TRP that will be used for UL transmission. Such indication may be provided prior to the actual UL transmission and may be provided to a single TRP (e.g. the Master TRP described in more detail below) or to multiple TRPs (for example, to all TRPs in the TRP list, to all TRPs associated with a specific signature). Such an indication may be used, for instance, to allow the network to reuse specific resources in TRPs which are not being utilized by the TRP. The indication may be sent in a predefined resource, or in such a way that it can be received simultaneously by multiple TRPs.

A WTRUs choice of a TRP to which to transmit UL transmission may be based on capability information of the TRP which may be broadcast by the network. TRP capability information may include possible TTIs which can be used for UL transmission. Information may also include type of traffic, logical channel priorities, or the like, which can be transmitted on this TRP. Capability information may also include information relating to whether the TRP supports CP, UP or both types of traffic. Capability information may also include maximum speed supported during UL transmission, or UL channels supported (e.g. PUCCH, SR, etc).

For example, a WTRU may be required to transmit L2 control information (such as MAC CE) only to specific TRPs based on their capability information.

A WTRU may identify, or be configured with a specific TRP which may act as the master TRP while the WTRU performs multi-connectivity with several TRPs. A WTRU may select and indicate the Master TRP to the network. Such an indication may be part of the TRP list which is provided to the network, whereby one of the TRPs would be designated by the WTRU as the master. The Master TRP may be selected based criteria which may include: the TRP with the best measurements, the TRP located the smallest distance from the WTRU, the TRP supporting all of the services/capabilities required by the WTRU at a given time, the TRP indicating ability to act as a Master TRP, or the TRP providing the WTRU with resources on which it may transmit Master TRP transmissions indicating which TRP any specific UL transmission is for.

A WTRU may expect certain control-related communication to take place only with the designated master TRP. For instance, a WTRU may be allowed to transmit/receive L2 control information from/to the master TRP.

A WTRU may further be configured to perform mobility related actions described herein (transmission of the RA, procedures related to WTRU-autonomous mobility) when it decides to change the Master TRP.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

What is claimed is:

1. A method implemented by a Wireless Transmit/Receive Unit (WTRU), the method comprising:
   receiving a configuration message from via a serving cell, wherein the configuration message comprises a configuration information for a candidate cell and a measurement condition for handover (HO) to the candidate cell, wherein the configuration information for the candidate cell comprises reference signal information for measurements associated with the measurement condition, and wherein the reference signal information indicates that the measurements associated with the measurement condition are to be performed on a synchronization signal of the candidate cell;
   determining to initiate HO to the candidate cell based on the measurement condition for HO to the candidate cell being satisfied;
   transmitting a preamble using physical random access channel (PRACH) resources of the candidate cell based on the measurement condition for HO to the candidate cell being satisfied;
   receiving a random access response (RAR), the RAR comprising scheduling information for an uplink transmission; and
   transmitting the uplink transmission, the uplink transmission scheduled by the RAR comprising WTRU context information.

2. The method of claim 1, wherein the measurement condition is associated with a configured measurement offset value.

3. The method of claim 1, further comprising receiving configuration information for a plurality of candidate cells and respective measurement conditions for HO to each of the plurality of candidate cells.

4. The method of claim 1, wherein the measurement condition corresponds to the WTRU determining that a measurement of the candidate cell is greater than a measurement of the serving cell by at least a configured offset amount.

5. The method of claim 4, wherein the measurement of the candidate cell is greater than the measurement of the serving cell by at least an offset amount.

6. The method of claim 1, wherein the measurement condition comprises a combination of multiple conditions.

7. The method of claim 1, wherein the WTRU context information comprises a radio network temporary identifier for the WTRU in the serving cell.

8. The method of claim 1, wherein the reference signal information indicates WTRU specific reference signals used to perform the measurements associated with the measurement condition.

9. A Wireless Transmit/Receive Unit (WTRU) comprising a processor and memory, the processor and memory configured to:
   receive a configuration message from via a serving cell, wherein the configuration message comprises a configuration information for a candidate cell and a measurement condition for handover (HO) to the candidate cell, wherein the configuration information for the candidate cell comprises reference signal information for measurements associated with the measurement condition, and wherein the reference signal information indicates that the measurements associated with the measurement condition are to be performed on a synchronization signal of the candidate cell;
   determine to initiate HO to the candidate cell and apply the configuration information for the candidate cell based on the measurement condition for HO to the candidate cell being satisfied;
   transmit a preamble using physical random access channel (PRACH) resources of the candidate cell based on the measurement condition for HO to the candidate cell being satisfied;
   receive a random access response (RAR), the RAR comprising scheduling information for an uplink transmission; and
   transmit the uplink transmission, the uplink transmission scheduled by the RAR comprising WTRU context information.

10. The WTRU of claim 9, wherein the measurement condition is associated with a configured measurement offset value.

11. The WTRU of claim 9, wherein the processor and memory are further configured to receive configuration information for a plurality of candidate cells and respective measurement conditions for HO to each of the plurality of candidate cells.

12. The WTRU of claim 9, wherein the measurement condition corresponds to the WTRU determining that a measurement of the candidate cell is greater than a measurement of the serving cell by at least a configured offset amount.

13. The WTRU of claim 12, wherein the measurement of the candidate cell is greater than the measurement of the serving cell by at least an offset amount.

14. The WTRU of claim 9, wherein the measurement condition comprises a combination of multiple conditions.

15. The WTRU of claim 9, wherein the WTRU context information comprises a radio network temporary identifier for the WTRU in the serving cell.

16. The WTRU of claim 9, wherein the reference signal information indicates WTRU specific reference signals used to perform the measurements associated with the measurement condition.

* * * * *

UNITED STATES PATENT AND TRADEMARK OFFICE
CERTIFICATE OF CORRECTION

| | |
|---|---|
| PATENT NO. | : 11,889,368 B2 |
| APPLICATION NO. | : 16/089899 |
| DATED | : January 30, 2024 |
| INVENTOR(S) | : Tooher et al. |

It is certified that error appears in the above-identified patent and that said Letters Patent is hereby corrected as shown below:

In the Claims

In Claim 1: Column 37, Lines 50, delete "from via a serving cell," and insert -- from a serving cell, --.

In Claim 9: Column 38, Lines 35, delete "from via a serving cell," and insert -- and from a serving cell, --.

Signed and Sealed this
Sixteenth Day of April, 2024

Katherine Kelly Vidal
*Director of the United States Patent and Trademark Office*